US012638863B2

(12) United States Patent
Rana

(10) Patent No.: US 12,638,863 B2
(45) Date of Patent: May 26, 2026

(54) ARTIFICIAL INTELLIGENCE BASED SYSTEM AND METHOD FOR MANAGING HETEROGENEOUS NETWORK-AGNOSTIC SWARM OF ROBOTS

(71) Applicant: Newspace Research and Technologies Pvt. Ltd., Bengaluru (IN)

(72) Inventor: Anurag Rana, Hisar (IN)

(73) Assignee: Newspace Research and Technologies Pvt. Ltd. (IN)

( * ) Notice: Subject to any disclaimer, the term of this patent is extended or adjusted under 35 U.S.C. 154(b) by 0 days.

(21) Appl. No.: 18/549,940

(22) PCT Filed: Mar. 11, 2022

(86) PCT No.: PCT/IB2022/052193
§ 371 (c)(1),
(2) Date: Sep. 11, 2023

(87) PCT Pub. No.: WO2022/190048
PCT Pub. Date: Sep. 15, 2022

(65) Prior Publication Data
US 2024/0160229 A1      May 16, 2024

(51) Int. Cl.
*G05D 1/698*      (2024.01)
*G05D 1/224*      (2024.01)
*G05D 1/229*      (2024.01)
*G05D 1/693*      (2024.01)
G05D 101/10      (2024.01)
G05D 109/25      (2024.01)

(52) U.S. Cl.
CPC ......... *G05D 1/6987* (2024.01); *G05D 1/2245* (2024.01); *G05D 1/2249* (2024.01); *G05D*

*1/2295* (2024.01); *G05D 1/693* (2024.01); *G05D 2101/10* (2024.01); *G05D 2109/254* (2024.01)

(58) Field of Classification Search
None
See application file for complete search history.

(56) References Cited

U.S. PATENT DOCUMENTS

| | | | |
|---|---|---|---|
| 11,565,424 B2 * | 1/2023 | High | B25J 19/04 |
| 2010/0312388 A1 * | 12/2010 | Jang | G05D 1/0088 |
| | | | 700/248 |
| 2017/0068243 A1 * | 3/2017 | MacCready | G05D 1/104 |
| 2017/0227968 A1 * | 8/2017 | Klinger | G05D 1/0088 |

(Continued)

*Primary Examiner* — Jelani A Smith
*Assistant Examiner* — Davin Seol
(74) *Attorney, Agent, or Firm* — Jason C. Cameron

(57) ABSTRACT

An AI based system and method for managing heterogeneous network-agnostic swarm of robots is disclosed. The method includes receiving a set of commands from a human machine interface associated with one or more electronic devices, determining one or more robotic capabilities associated with autonomous robot and capturing one or more positional parameters by using one or more sensors. The method includes broadcasting the one or more robotic capabilities and the one or more positional parameters to each of the one or more autonomous robots and determining one or more situational parameters associated with the one or more autonomous robots. Furthermore, the method includes detecting one or more targets and allocating the one or more tasks and the detected one or more targets among the one or more autonomous robots.

8 Claims, 11 Drawing Sheets

(56) References Cited

U.S. PATENT DOCUMENTS

| | | | |
|---|---|---|---|
| 2017/0255198 A1* | 9/2017 | Rodriguez | G05D 1/0274 |
| 2020/0016754 A1* | 1/2020 | Skubch | B25J 9/1682 |
| 2020/0282561 A1* | 9/2020 | Dey | G05B 13/028 |
| 2021/0088337 A1* | 3/2021 | Koubaa | H04L 67/025 |
| 2021/0107153 A1* | 4/2021 | Poornachandran | G05B 19/042 |
| 2021/0116889 A1* | 4/2021 | Keravala | E21C 35/24 |
| 2022/0100184 A1* | 3/2022 | Natarajan | G06N 3/0499 |
| 2022/0143653 A1* | 5/2022 | Berger | G05D 1/0291 |
| 2022/0183209 A1* | 6/2022 | Scott-Robinson | G05D 1/0225 |
| 2022/0197306 A1* | 6/2022 | Cella | G05B 19/41865 |
| 2023/0171154 A1* | 6/2023 | Kattepur | H04L 41/0823 |
| | | | 709/220 |
| 2023/0394294 A1* | 12/2023 | Chiu | G06N 3/092 |

* cited by examiner

Figure 2:
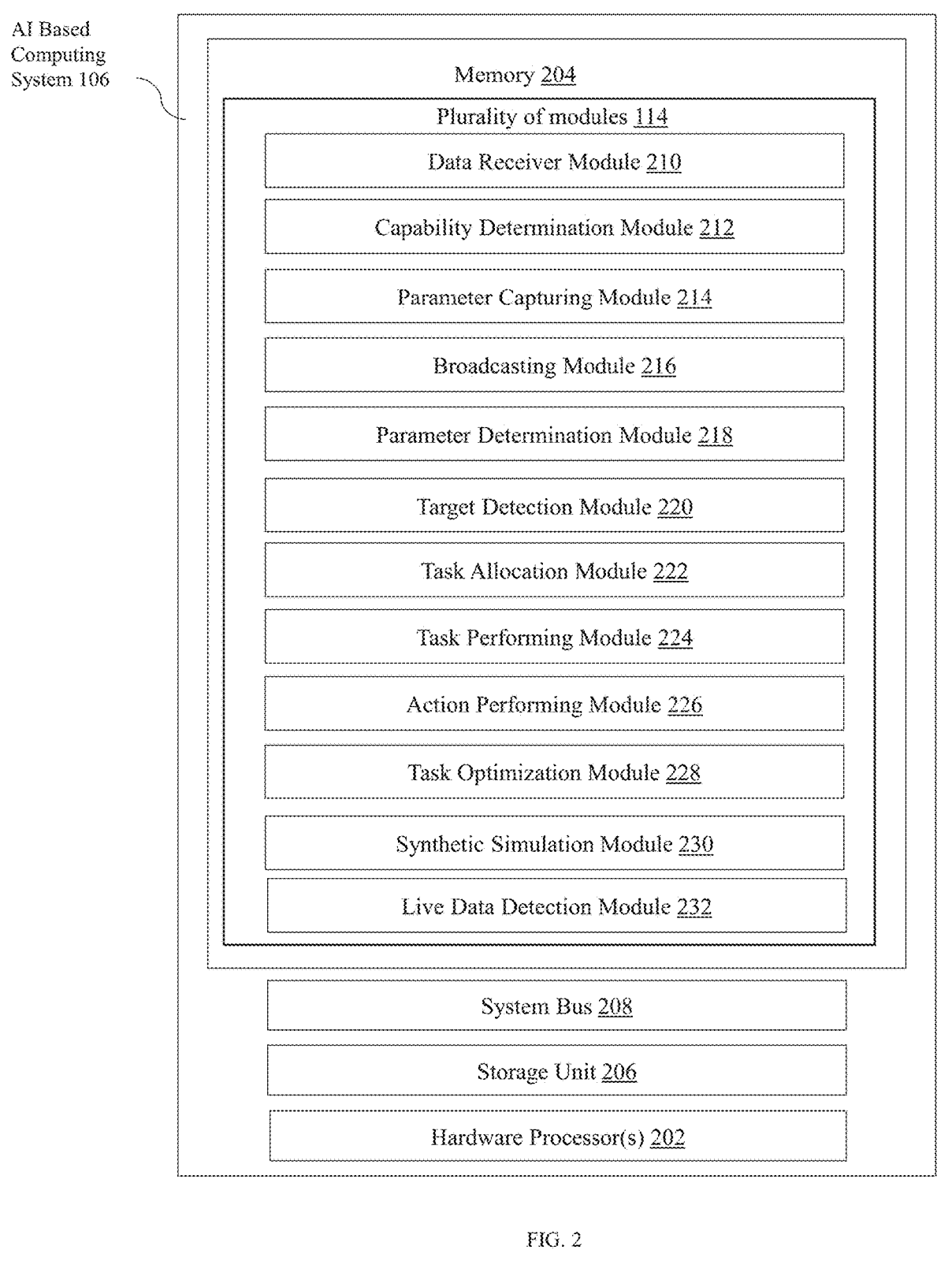

AI Based
Computing
System 106

Memory 204

Plurality of modules 114

Data Receiver Module 210

Capability Determination Module 212

Parameter Capturing Module 214

Broadcasting Module 216

Parameter Determination Module 218

Target Detection Module 220

Task Allocation Module 222

Task Performing Module 224

Action Performing Module 226

Task Optimization Module 228

Synthetic Simulation Module 230

Live Data Detection Module 232

System Bus 208

Storage Unit 206

Hardware Processor(s) 202

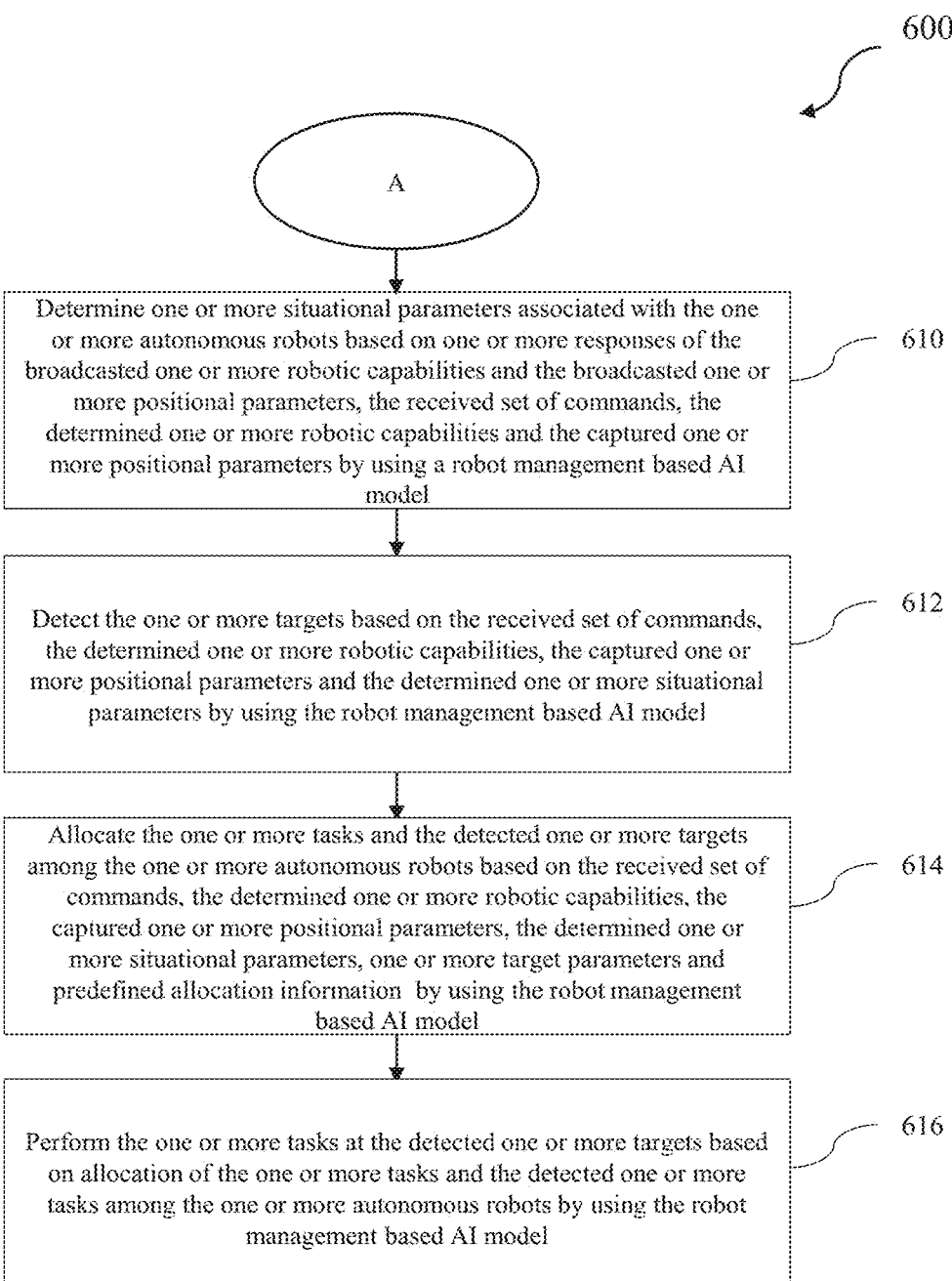

600

A

Determine one or more situational parameters associated with the one or more autonomous robots based on one or more responses of the broadcasted one or more robotic capabilities and the broadcasted one or more positional parameters, the received set of commands, the determined one or more robotic capabilities and the captured one or more positional parameters by using a robot management based AI model — 610

Detect the one or more targets based on the received set of commands, the determined one or more robotic capabilities, the captured one or more positional parameters and the determined one or more situational parameters by using the robot management based AI model — 612

Allocate the one or more tasks and the detected one or more targets among the one or more autonomous robots based on the received set of commands, the determined one or more robotic capabilities, the captured one or more positional parameters, the determined one or more situational parameters, one or more target parameters and predefined allocation information  by using the robot management based AI model — 614

Perform the one or more tasks at the detected one or more targets based on allocation of the one or more tasks and the detected one or more tasks among the one or more autonomous robots by using the robot management based AI model — 616

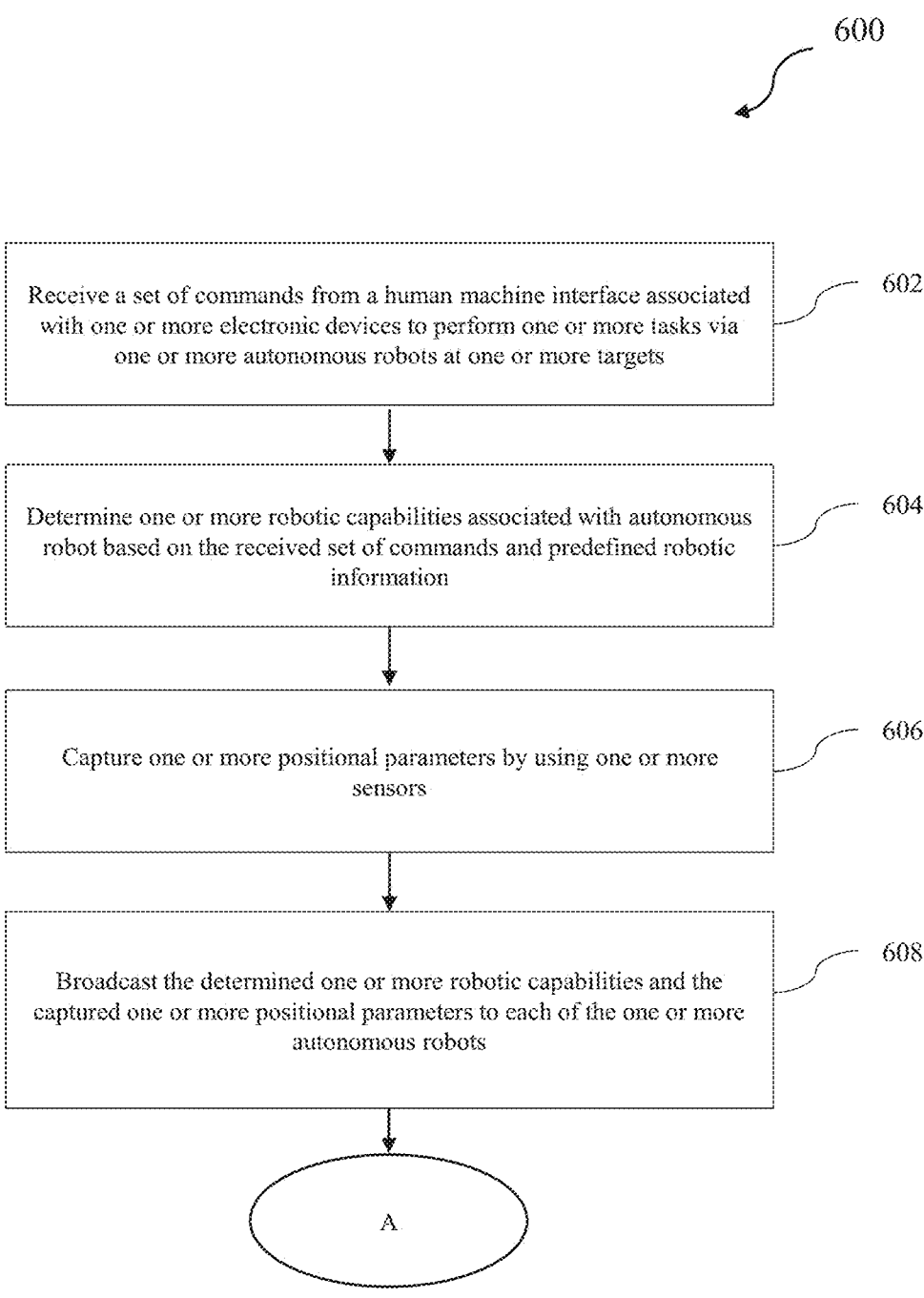

Receive a set of commands from a human machine interface associated with one or more electronic devices to perform one or more tasks via one or more autonomous robots at one or more targets — 602

Determine one or more robotic capabilities associated with autonomous robot based on the received set of commands and predefined robotic information — 604

Capture one or more positional parameters by using one or more sensors — 606

Broadcast the determined one or more robotic capabilities and the captured one or more positional parameters to each of the one or more autonomous robots — 608

| DroneID | Heart Beat | Flight Mode | Sat | HDOP | Volt. | Yaw | Vel. | Alt. | Current Routine Index |
|---------|-----------|-------------|-----|------|-------|-----|------|------|----------------------|
| 001 | Present | Guided | 23 | 0.5 | 49.7 | 341 | 0 | 0.0 | 3/5 |
| 001 | Present | Guided | 23 | 0.5 | 49.7 | 341 | 0 | 0.0 | 3/5 |
| 001 | Present | Guided | 23 | 0.5 | 49.7 | 341 | 0 | 0.0 | 3/5 |
| 001 | Present | Guided | 23 | 0.5 | 49.7 | 341 | 0 | 0.0 | 3/5 |
| 001 | Present | Guided | 23 | 0.5 | 49.7 | 341 | 0 | 0.0 | 3/5 |

| Current Routine | Routine Data |
|---|---|
| MoveToPosition (MoveToPosition) | Alt_Distance:00m Distance:8,298m |
| MoveToPosition (MoveToPosition) | Alt_Distance:00m Distance:8,298m |
| MoveToPosition (MoveToPosition) | Alt_Distance:00m Distance:8,298m |
| MoveToPosition (MoveToPosition) | Alt_Distance:00m Distance:8,298m |
| MoveToPosition (MoveToPosition) | Alt_Distance:00m Distance:8,298m |

ARTIFICIAL INTELLIGENCE BASED SYSTEM AND METHOD FOR MANAGING HETEROGENEOUS NETWORK-AGNOSTIC SWARM OF ROBOTS

EARLIEST PRIORITY DATE

This application claims priority from a Provisional patent application filed in India having Patent Application No. 202141010296, filed on Mar. 11, 2021, and titled "SYSTEM AND METHOD FOR MANAGING HETEROGENOUS NETWORK-AGNOSTIC SWARM OF UNMANNED VEHICLES".

FIELD OF INVENTION

Embodiments of the present disclosure relate to Artificial Intelligence (AI) based systems and more particularly relates to an AI based system and method for managing heterogeneous network-agnostic swarm of robots.

BACKGROUND

Generally, autonomous robots, such as unmanned vehicles are useful in numerous application scenarios, specifically those unreachable or dangerous to humans, such as area patrol, disaster rescue missions, surveillance monitoring of events and the like. Further, a "swarm" is referred to a set of autonomous robots that work together in a coordinated manner to execute any given task.

In conventional approach, the swarm uses a role-based method of "master-slave" for co-ordination. The stated approach steers motion of the entire swarm around a leader (master) autonomous robot in an orderly manner. Each of the set of autonomous robots in the swarm follows the master autonomous robot and the associated decisions. However, this approach has a huge drawback in cases where the master autonomous robot becomes dysfunctional or compromised for some reason, then the whole swarm becomes dysfunctional.

Another approach for controlling the swarm is via a command centre, where each of the set of autonomous robots forming the swarm receives its instructions from the command centre. This approach also suffers with a limitation with respect to availability of communication network. In absence of the communication network or in a weak network, the swarm fails to function, this greatly limits its geographical reach. Further, present swarming solutions are capable of managing the swarm comprising of homologous autonomous robots with the aforementioned limitations, but ineffective in controlling a swarm comprising of heterogenous autonomous robots.

Hence, there is a need for an improved AI based system and method for managing heterogeneous network-agnostic swarm of robots, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, an Artificial Intelligence (AI) based computing system for managing heterogeneous network-agnostic swarm of robots is disclosed. The AI based computing system includes one or more hardware processors and a memory coupled to the one or more hardware processors. The memory includes a plurality of modules in the form of programmable instructions executable by the one or more hardware processors. The plurality of modules include a data receiver module configured to receive a set of commands from a human machine interface associated with one or more electronic devices to perform one or more tasks via one or more autonomous robots at one or more targets. The set of commands are derived from one or more high-level commands provided by an operator for performing the one or more tasks via the one or more autonomous robots. The plurality of modules also include a capability determination module configured to determine one or more robotic capabilities associated with autonomous robot based on the received set of commands and predefined robotic information. The one or more robotic capabilities comprise: type of payload, type of sensors, speed, weight holding capacity, configuration, battery level, class and weight of the autonomous robot. The plurality of modules includes a parameter capturing module configured to capture one or more positional parameters by using one or more sensors. The one or more positional parameters include position of the autonomous robot, anticipated position of the autonomous robot, one or more images of the one or more targets, one or more videos of the one or more targets, a set of images of other autonomous robots in proximity, a set of videos of the other autonomous robots and one or more audios of surrounding environment. Further, the plurality of modules include a broadcasting module configured to broadcast the determined one or more robotic capabilities and the captured one or more positional parameters to each of the one or more autonomous robots. The plurality of modules also include a parameter determination module configured to determine one or more situational parameters associated with the one or more autonomous robots based on one or more responses of the broadcasted one or more robotic capabilities and the broadcasted one or more positional parameters, the received set of commands, the determined one or more robotic capabilities and the captured one or more positional parameters by using a robot management based Artificial Intelligence (AI) model. The one or more situational parameters include type of payload, type of sensors, speed, weight capacity, class, battery level of each of the one or more autonomous robots, position of each of the one or more autonomous robots, anticipated position of each of the one or more autonomous robots, one or more images of the one or more targets, one or more videos of the one or more targets, a set of images of the one or more autonomous robots, a set of videos of the one or more autonomous robots, relative position of the autonomous robots with respect to each of the one or more autonomous robots and one or more audios of surrounding environment. Furthermore, the plurality of modules include a target detection module configured to detect the one or more targets based on the received set of commands, the determined one or more robotic capabilities, the captured one or more positional parameters and the determined one or more situational parameters by using the robot management based AI model. The plurality of modules include a task allocation module configured to allocate the one or more tasks and the detected one or more targets among the one or more autonomous robots based on the received set of commands, the determined one or more robotic capabilities, the captured one or more positional parameters, the determined one or more situational parameters, one or more target parameters and predefined allocation information by using the robot management based AI model. The one or more target parameters include number of the one or more target, size of each of the one or more targets and sensor footprint corresponding to each of the one or more autonomous robots. The plurality of modules include a task performing module configured to perform the one or more tasks at the detected one or more targets based on allocation of the one or more tasks and the detected one or more tasks among the one or more autonomous robots by using the robot management based AI model.

In accordance with another embodiment of the present disclosure, an Artificial Intelligence (AI) based method for managing heterogeneous network-agnostic swarm of robots is disclosed. The AI based method includes receiving a set of commands from a human machine interface associated with one or more electronic devices to perform one or more tasks via one or more autonomous robots at one or more targets. The set of commands are derived from one or more high-level commands provided by an operator for performing the one or more tasks via the one or more autonomous robots. The AI based method further includes determining one or more robotic capabilities associated with autonomous robot based on the received set of commands and predefined robotic information. The one or more robotic capabilities comprise: type of payload, type of sensors, speed, weight holding capacity, configuration, battery level, class and weight of the autonomous robot. Further, the AI based method includes capturing one or more positional parameters by using one or more sensors. The one or more positional parameters include: position of the autonomous robot, anticipated position of the autonomous robot, one or more images of the one or more targets, one or more videos of the one or more targets, a set of images of other autonomous robots in proximity, a set of videos of the other autonomous robots and one or more audios of surrounding environment. Also, the AI based method includes broadcasting the determined one or more robotic capabilities and the captured one or more positional parameters to each of the one or more autonomous robots. Furthermore, the AI based method includes determining one or more situational parameters associated with the one or more autonomous robots based on one or more responses of the broadcasted one or more robotic capabilities and the broadcasted one or more positional parameters, the received set of commands, the determined one or more robotic capabilities and the captured one or more positional parameters by using a robot management based Artificial Intelligence (AI) model. The one or more situational parameters comprise: type of payload, type of sensors, speed, weight capacity, class, battery level of each of the one or more autonomous robots, position of each of the one or more autonomous robots, anticipated position of each of the one or more autonomous robots, one or more images of the one or more targets, one or more videos of the one or more targets, a set of images of the one or more autonomous robots, a set of videos of the one or more autonomous robots, relative position of the autonomous robots with respect to each of the one or more autonomous robots and one or more audios of surrounding environment. The AI based method also includes detecting the one or more targets based on the received set of commands, the determined one or more robotic capabilities, the captured one or more positional parameters and the determined one or more situational parameters by using the robot management based AI model. Further, the AI based method includes allocating the one or more tasks and the detected one or more targets among the one or more autonomous robots based on the received set of commands, the determined one or more robotic capabilities, the captured one or more positional parameters, the determined one or more situational parameters, one or more target parameters and predefined allocation information by using the robot management based AI model. The one or more target parameters include: number of the one or more target, size of each of the one or more targets and sensor footprint corresponding to each of the one or more autonomous robots. The method includes performing the one or more tasks at the detected one or more targets based on allocation of the one or more tasks and the detected one or more tasks among the one or more autonomous robots by using the robot management based AI model.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 2 is a block diagram illustrating an exemplary Artificial Intelligence (AI) based computing system for managing heterogeneous network-agnostic swarm of robots, in accordance with an embodiment of the present disclosure;

FIG. 6 is a process flow diagram illustrating an exemplary AI based method for managing heterogeneous network-agnostic swarm of robots, in accordance with an embodiment of the present disclosure.

Figure 1:
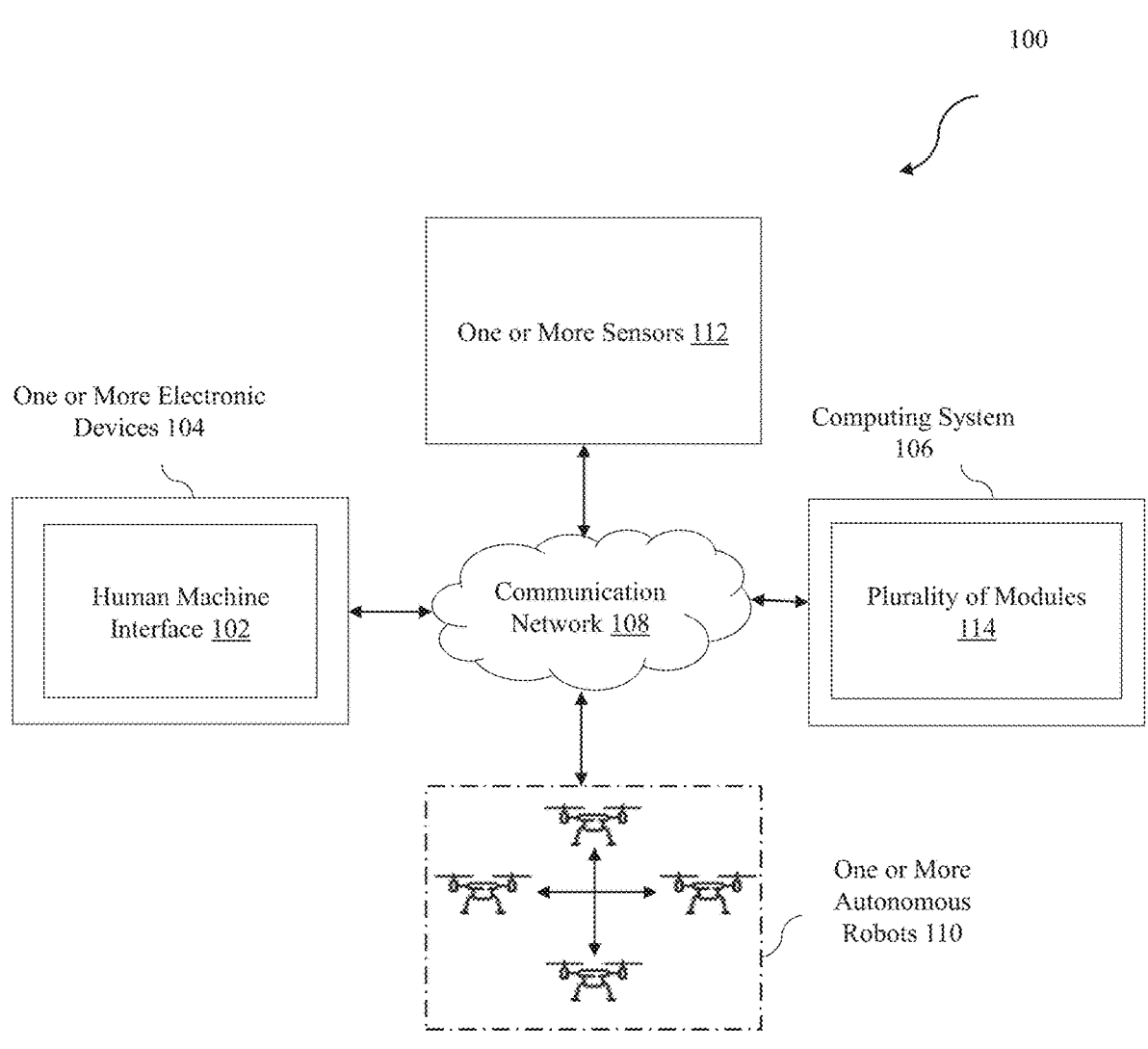
FIG. 1 is a block diagram illustrating an exemplary computing environment for managing heterogeneous network-agnostic swarm of robots, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof. In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 7C, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for managing heterogeneous network-agnostic swarm of robots, in accordance with an embodiment of the present disclosure. According to FIG. 1, the computing environment 100 includes a human machine interface 102 associated with one or more electronic devices 104 communicatively coupled to an Artificial Intelligence (AI) based computing system via a communication network 108. In an embodiment of the present disclosure, an operator uses the human machine interface 102 to provide one or more high-level commands for enabling one or more autonomous robots 110 to perform one or more tasks. The one or more autonomous robots 110 collectively form a heterogeneous swarm to perform the one or more tasks collaboratively. For example, the one or more tasks include rescue survivors, drop medical kit, drop food boxes, destroy targets, capture images and the like. In an embodiment of the present disclosure, the human machine interface 102 also derives a set of commands from the one or more high-level commands provided by the operator for performing the one or more tasks via the one or more autonomous robots 110. Further, the operator also uses the human machine interface 102 to receive one or more live parameters. Details on the one or more live parameters have been elaborated in subsequent paragraphs of the present description with reference to FIG. 2. In an exemplary embodiment of the present disclosure, the one or more high-level commands include a set of predefined commands representing the one or more tasks to be performed by the one or more autonomous robots 110, source, destination, time of performing the one or more tasks, role and speed of each of the one or more autonomous vehicles, altitude from ground, one or more predefined conditions, a navigation path from the source to the destination, boundary fence, one or more intermediate locations, the one or more targets, safe area and danger area. In an embodiment of the present disclosure, the one or more high-level commands are provided on a geo-referenced map. For example, the set of predefined commands may be arm, deliver package, flock, forage, land, move to position, school, take off, wait for Global Positioning System (GPS), wait, find survivors, drop payload and the like. The communication network 108 may be internet, radio signals, 4G network, 5G network, or any other wireless network. In an embodiment of the present disclosure, the AI based computing system 106 may be hosted on each of the one or more autonomous robots 110. For the sake of present description, the computing system is explained with respect to a single autonomous robot. However, it must be obvious to a person skilled in the art that the AI based computing system 106 may be deployed on each of the one or more autonomous robots 110. In another embodiment of the present disclosure, the AI based computing system 106 may be hosted on a central server, such as cloud server or a remote server. In an exemplary embodiment of the present disclosure, the one or more electronic devices 104 may include a laptop computer, desktop computer, tablet computer, smartphone, wearable device, smart watch, a digital camera and the like. For example, the wearable device may be an augmented reality headset, virtual reality headset and the like. The augmented reality headset and the virtual reality headset allows interfacing with heterogeneous swarm. In an embodiment of the present disclosure, the human operator may play back a swarming session that unfolded over space and time by using the one or more electronic devices 104.

Further, the computing environment 100 includes the one or more autonomous robots 110 communicatively coupled to the AI based computing system 106 via the communication network 108. In an embodiment of the present disclosure, the AI based computing system 106 is deployed on each of the one or more autonomous robots 110. In an exemplary embodiment of the present disclosure, the one or more autonomous robots 110 are unmanned vehicles. For example, the one or more autonomous robots 110 may include unmanned aerial vehicles, unmanned ground vehicles, unmanned water vehicles and the like. In an embodiment of the present disclosure, each of the one or more autonomous robots 110 is having different robotic capabilities, such as type of payload, type of sensors, speed, weight holding capacity, configuration, battery level, class and weight. Thus, the one or more autonomous robots 110 collectively form a heterogeneous swarm. For example, the heterogenous swarms is a mix of different unmanned aerial vehicles with unmanned ground vehicles. Further, each of one or more autonomous robots 110 may work independent of network connection after initial set of commands are received. Thus, the one or more autonomous robots 110 are network agnostic.

Furthermore, the computing environment 100 includes one or more sensors 112 communicatively coupled to the AI based computing system 106 via the communication network 108. In an embodiment of the present disclosure, the one or more sensors 112 are fixed with the one or more autonomous robots 110 to capture one or more positional parameters. For example, the one or more sensors 112 include one or more image capturing units, one or more audio capturing units, optical and infrared sensors, Global Positioning System (GPS) and the like. Details on the one or more positional parameters have been elaborated in subsequent paragraphs of the present description with reference to FIG. 2.

Further, the one or more electronic devices 104 include a local browser, a mobile application or a combination thereof. Furthermore, the operator may use a web application via the local browser, the mobile application or a combination thereof to communicate with the AI based computing system 106 and control the heterogeneous swarm of the one or more autonomous robots 110. In an exemplary embodiment of the present disclosure, the mobile application may be compatible with any mobile operating system, such as android, iOS, and the like. In an embodiment of the present disclosure, the AI based computing system 106 includes a plurality of modules 114. Details on the plurality of modules 114 have been elaborated in subsequent paragraphs of the present description with reference to FIG. 2.

In an embodiment of the present disclosure, the AI based computing system 106 is deployed on each of the one or more autonomous robots 110. However, for the sake of the description, the computing system is explained from the perspective of a single autonomous robot. The AI based computing system 106 i.e., deployed on the autonomous robot, is configured to receive the set of commands from the human machine interface 102 associated with one or more electronic devices 104 to perform the one or more tasks via the one or more autonomous robots 110 at one or more targets. The AI based computing system 106 determines one or more robotic capabilities associated with the autonomous robot based on the received set of commands and predefined robotic information. The AI based computing system 106 captures the one or more positional parameters by using the one or more sensors 112. Furthermore, the AI based computing system 106 broadcasts the determined one or more robotic capabilities and the captured one or more positional parameters to each of the one or more autonomous robots 110. The AI based computing system 106 determines one or more situational parameters associated with the one or more autonomous robots 110 based on one or more responses of the broadcasted one or more robotic capabilities and the broadcasted one or more positional parameters, the received set of commands, the determined one or more robotic capabilities and the captured one or more positional parameters by using a robot management based Artificial Intelligence (AI) model. The AI based computing system 106 detects the one or more targets based on the received set of commands, the determined one or more robotic capabilities, the captured one or more positional parameters and the determined one or more situational parameters by using the robot management based AI model. The AI based computing system 106 allocates the one or more tasks and the detected one or more targets among the one or more autonomous robots 110 based on the received set of commands, the determined one or more robotic capabilities, the captured one or more positional parameters, the determined one or more situational parameters, one or more target parameters and predefined allocation information by using the robot management based AI model. Further, the AI based computing system 106 performs the one or more tasks at the detected one or more targets based on allocation of the one or more tasks and the detected one or more tasks among the one or more autonomous robots 110 by using the robot management based AI model.

FIG. 2 is a block diagram illustrating an exemplary Artificial Intelligence (AI) based computing system 106 for managing heterogeneous network-agnostic swarm of robots, in accordance with an embodiment of the present disclosure. Further, the AI based computing system 106 104 includes one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 114 in the form of programmable instructions executable by the one or more hardware processors 202. The plurality of modules 114 are configured to execute a set of specific functions at different levels. Further, the plurality of modules 114 includes a data receiver module 210, a capability determination module 212, a parameter capturing module 214, a broadcasting module 216, a parameter determination module 218, a target detection module 220, a task allocation module 222, a task performing module 224, an action performing module 226, a task optimization module 228, a synthetic simulation module 230 and a live data detection module 232.

In an embodiment of the present disclosure, the AI based computing system 106 corresponds to an autonomous robot from the one or more autonomous robots 110. The AI based computing system 106 is deployed on each of the one or more autonomous robots 110. In an embodiment of the present disclosure, the AI based computing system 106 is deployed at level of specific individual class of the one or more autonomous robots 110 for interfacing with a single swarming system. In an exemplary embodiment of the present disclosure, the one or more autonomous robots 110 are unmanned vehicles, such as Unmanned Aerial Vehicles (UAVs), unmanned ground vehicles, unmanned water vehicles and the like. In an embodiment of the present disclosure, each of the one or more autonomous robots 110 is having different robotic capabilities, such as type of payload, type of sensors, speed, weight holding capacity, configuration, composition, battery level, class and weight. Thus, the one or more autonomous robots 110 collectively form a heterogeneous swarm. For example, the heterogenous swarms is a mix of different unmanned aerial vehicles with unmanned ground vehicles. Further, each of one or more autonomous robots 110 may work independent of network connection after initial set of commands are received. Thus, the one or more autonomous robots 110 are network agnostic. For example, when a swarming mission has been configured based on the set of commands and deployed to heterogeneous swarm of the one or more autonomous robots 110, the mission is proceeded. Further, Ground Control Station (GCS) or man on the loop is more like a monitoring system, and less of a command system. The heterogeneous swarm itself doesn't wait for or require any instructions to perform one or more tasks it has been configured with. In an embodiment of the present disclosure, the one or more tasks may be performed at distances at which communication doesn't reach. Thus, the one or more autonomous robots 110 communicate amongst themselves for cooperative swarming rather than with the GCS.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 114 stored in the form of machine-readable instructions on any of the above-mentioned storage media and may be in communication with and executed by the one or more hardware processors 202.

The storage unit 206 may be a cloud storage or local storage inside each of the one or more autonomous robots 110. The storage unit 206 may store the one or more high-level commands, the set of commands, the one or more robotic capabilities, the one or more positional parameters and the one or more situational parameters. The storage unit 206 may also store the one or more target parameters, the predefined allocation information, one or more collision parameters, one or more task parameters, one or more optimization parameters and one or more live parameters.

The data receiver module 210 is configured to receive the set of commands from the human machine interface 102 associated with the one or more electronic devices 104 to perform the one or more tasks via the one or more autonomous robots 110 at the one or more targets. The human machine interface 102 is configured in the one or more electronic devices 104. In an embodiment of the present disclosure, an operator uses human machine interface 102 to provide the one or more high-level commands for enabling the one or more autonomous robots 110 to perform the one or more tasks. In an embodiment of the present disclosure, the one or more high-level commands are prepared on a Ground Control Station (GCS) on the basis of the geo-reference map. The one or more high-level commands enable the one or more autonomous robots 110 to perform the one or more tasks as a swarm. In an embodiment of the present disclosure, the one or more autonomous robots 110 collectively form a heterogeneous swarm to collaboratively perform the one or more tasks. The one or more high-level commands are issued by the human to the heterogeneous swarm, such that each of the one or more autonomous robots 110 act cooperatively to do lower level taskings to achieve the one or more high-level commands in a cooperative manner. The one or more tasks are performed concurrently or in stages. For example, the one or more tasks include rescue survivors, drop medical kit, drop food boxes, destroy targets, capture images and the like. In an embodiment of the present disclosure, the human machine interface 102 also derives the set of commands from the one or more high-level commands provided by the operator for performing the one or more tasks via the one or more autonomous robots 110. The human machine interface 102 is deployed at full swarm level. The set of commands are machine readable commands which enables the one or more autonomous robots 110 to collaboratively perform the one or more tasks. In an embodiment of the present disclosure, the set of commands correspond to a mission. In an exemplary embodiment of the present disclosure, the one or more high-level commands include a set of predefined commands representing the one or more tasks to be performed by the one or more autonomous robots 110, source, destination, time of performing the one or more tasks, role and speed of each of the one or more autonomous vehicles, altitude from ground, one or more predefined conditions, a navigation path from the source to the destination, boundary fence, one or more intermediate locations, the one or more targets, safe area and danger area. In an embodiment of the present disclosure, the one or more high-level commands are provided on the geo-referenced map. For example, the set of predefined commands may be arm, deliver package, flock, forage, land, move to position, school, take off, wait for Global Positioning System (GPS), wait, find survivors, drop payload and the like. In an embodiment of the present disclosure, the AI based computing system 106 may be hosted on each of the one or more autonomous robots 110. For the sake of present description, the computing system is explained with respect to a single autonomous robot. However, it must be obvious to a person skilled in the art that the AI based computing system 106 may be deployed on each of the one or more autonomous robots 110. In another embodiment of the present disclosure, the AI based computing system 106 may be hosted on a central server, such as cloud server or a remote server. In an embodiment of the present disclosure, the navigation path is provided by the operator. In another embodiment of the present disclosure, the navigation path is generated by the human machine interface 102 based on the source, the destination and the GPS. In an exemplary embodiment of the present disclosure, the one or more electronic devices 104 may include a laptop computer, desktop computer, tablet computer, smartphone, wearable device, smart watch, a digital camera and the like. For example, the wearable device may be an augmented reality headset, virtual reality headset and the like. In an embodiment of the present disclosure, the human machine interface 102 communicates with the AI based computing system 106 via the communication network 108.

In an embodiment of the present disclosure, each of the one or more autonomous robots 110 in the heterogeneous swarm know current swarming state while moving from the source to the destination. The heterogeneous swarm transitions to a new state and that cascades to swarming entities moving on to other roles when the one or more predefined conditions are met, such as enough prerequisite numbers have reached the destination. In an embodiment of the present disclosure, the one or more predefined conditions are parameterised and configured before the mission. In an embodiment of the present disclosure, each of the one or more autonomous robots 110 may behave as the heterogeneous swarm as they regularly sync up each other's locations in real time.

The capability determination module 212 is configured to determine the one or more robotic capabilities associated with autonomous robot based on the received set of commands and the predefined robotic information. In an exemplary embodiment of the present disclosure, the one or more robotic capabilities include type of payload, type of sensors, speed, weight holding capacity, configuration, battery level, class, weight of the autonomous robot and the like. For example, the class of the autonomous robot may be 20 kg hexacopters with 10 kg quadcopters, Belluga (BLL), Nimbus (NMB), Mackeral (MCL), an unmanned vehicle with camera fitting, quadcopter, hexacopter and ground unmanned vehicle with different working speed and the like. In an exemplary embodiment of the present disclosure, the type of the payload is camera payload, robots, medical kit, communication enabling antenna payload, weapon and the like. In an embodiment of the present disclosure, each of the one or more autonomous robots 110 may accommodate other autonomous robots in accordance with time and speed.

The parameter capturing module 214 is configured to capture the one or more positional parameters by using the one or more sensors 112. In an exemplary embodiment of the present disclosure, the one or more positional parameters include position of the autonomous robot, anticipated position of the autonomous robot, one or more images of the one or more targets, one or more videos of the one or more targets, a set of images of other autonomous robots in proximity, a set of videos of the other autonomous robots, one or more audios of surrounding environment and the like. In an embodiment of the present disclosure, the one or more sensors 112 are fixed with each of the one or more autonomous robots 110 to capture the one or more positional parameters. For example, the one or more sensors 112 include one or more image capturing units, one or more audio capturing units, Global Positioning System (GPS), Lidar, Radar and the like.

The broadcasting module 216 is configured to broadcast the determined one or more robotic capabilities and the captured one or more positional parameters to each of the one or more autonomous robots 110. In an embodiment of the present disclosure, the determined one or more robotic capabilities and the captured one or more positional parameters are broadcasted via the communication network 108. In an embodiment of the present disclosure, the determined one or more robotic capabilities and the captured one or more positional parameters are compressed and encrypted before broadcasting to maintain data privacy.

The parameter determination module 218 is configured to determine the one or more situational parameters associated with the one or more autonomous robots 110 based on one or more responses of the broadcasted one or more robotic capabilities and the broadcasted one or more positional parameters, the received set of commands, the determined one or more robotic capabilities and the captured one or more positional parameters by using a robot management based Artificial Intelligence (AI) model. In an exemplary embodiment of the present disclosure, the one or more situational parameters include type of payload, type of sensors, speed, weight capacity, class, battery level of each of the one or more autonomous robots 110, position of each of the one or more autonomous robots 110, anticipated position of each of the one or more autonomous robots 110, one or more images of the one or more targets, one or more videos of the one or more targets, a set of images of the one or more autonomous robots 110, a set of videos of the one or more autonomous robots 110, relative position of the autonomous robots with respect to each of the one or more autonomous robots 110, one or more audios of surrounding environment and the like. Since each of the one or more autonomous robots 110 have different type of payload, type of sensors, speed, weight holding capacity, configuration, class, weight and the like, the one or more autonomous robots 110 form heterogeneous swarm. For example, when the class of the one or more autonomous robots 110 are same and the type of payloads associated with the one or more autonomous robots 110 are different, the one or more autonomous robots 110 may still form the heterogeneous swarms.

In an embodiment of the present disclosure, heterogeneity in the form of different types of payloads results in the one or more autonomous robots 110 playing certain roles, such as communication payload facilities communication, and may not do search, which requires cameras systems. Further, autonomous robot with a camera may look for targets and share with swarm of the one or more autonomous robots 110. For example, autonomous robots carrying a mission payload may then service the one or more targets.

In an embodiment of the present disclosure, roles are assigned to different autonomous robots on the basis of their configuration, and they play their roles accordingly. For example, in a honey-bee swarm, there are worker bees, warrior bees and the like which play different roles. Further, heterogeneity may also be in terms of similar class of autonomous robots, such as quadcopter and hexacopter means they have at least matching speeds and the like. Thus, envelope of speed is similar, but flight time may vary. In another example, bigger Integrated Circuits (IC) engine powered hexacopters act as motherships carrying small battery powered multicopters as payload, and then the heterogeneous swarm cascades as small quads are deployed. Furthermore, across class swarming, such as mix and match of classes (for example, fixed wing+multicopter) is also evolving, where certain aspects, such as collision avoidance may still happen, and faster unit may try to accommodate smaller units. In an exemplary embodiment of the present disclosure, this may also be done with ground vehicle as a swarm entity, where top hovering swarm entities stay in a relation with a slower moving ground unit, such as a manned vehicle on ground that is a part of swarm as part of a Manned-Unmanned Teaming (MUMT). Alternatively, a fast-moving manned vehicle in air for MUMT between aerial assets. In an embodiment of the present disclosure, the heterogeneous swarm corresponds to swarm of manned and unmanned autonomous vehicles to achieve the MUMT characteristics.

The target detection module 220 is configured to detect the one or more targets based on the received set of commands, the determined one or more robotic capabilities, the captured one or more positional parameters and the determined one or more situational parameters by using the robot management based AI model. In an embodiment of the present disclosure, the one or more targets refer to an object, point of attention or area of interest for performing the one or more tasks. For example, the object may be aircraft, ship, any ground vehicle, human beings, a piece of land and the like. In an embodiment of the present disclosure, the robot management based AI model may correspond to computer vision and machine learning techniques.

The task allocation module 222 is configured to allocate the one or more tasks and the detected one or more targets among the one or more autonomous robots 110 based on the received set of commands, the determined one or more robotic capabilities, the captured one or more positional parameters, the determined one or more situational parameters, one or more target parameters and the predefined allocation information by using the robot management based AI model. In an exemplary embodiment of the present disclosure, the one or more target parameters include number of the one or more target, size of each of the one or more targets, sensor footprint corresponding to each of the one or more autonomous robots 110 and the like. For example, when the one or more autonomous robots 110 reach the detected one or more targets, the one or more autonomous robots 110 collaboratively divide the one or more target area amongst themselves and start a forage behavior, thus covering the area looking for the one or more targets. In an example, when the target area is of 300 square feet and the number of the one or more autonomous robots 110 is 5, the target area is divided into 60 square feet, such that each of the one or more autonomous robots 110 get 60 square feet area.

The task performing module (224) is configured to perform the one or more tasks at the detected one or more targets based on allocation of the one or more tasks and the detected one or more tasks among the one or more autonomous robots 110 by using the robot management based AI model. In an embodiment of the present disclosure, the one or more autonomous robots 110 perform autonomous take-off and demonstrates a flocking behaviour, like a flock of birds behaviour cohesively. For example, swarm of the one or more autonomous robots 110 may utilise the payload, such as a camera to detect the one or more targets and address the detection with a payload drop, such as humanitarian aid during an emergency scenario like an earthquake. In an embodiment of the present disclosure, the payload is dropped based on speed and location of the one or more autonomous robots 110, location of the one or more targets, wind speed and the like. For example, the one or more autonomous robots 110 in the heterogeneous swarm know how many of autonomous robots are present at an area while sync up. Further, the 'area' is divided by the sensor footprint i.e., swath of the sensor, to be used for search.

Furthermore, the area is divided into a length that needs to be holistically traversed. The 'length' is then divided by the number of the one or more autonomous robots 110 present, which gives start points along this length-line along length-segments. Further, each of the one or more autonomous robots 110 in the heterogeneous swarm proceed to their respective assigned length segment and traverse this. In an embodiment of the present disclosure, the predefined allocation information include a set of rules for assignment. For example, the assignment is based on a concept of 'seniority'. A drone with smaller Internet Protocol (IP) address may be assigned first position.

In an embodiment of the present disclosure, the action performing module 226 is configured to determine one or more collision parameters based on the determined one or more situational parameters by using the robot management based AI model. In an exemplary embodiment of the present disclosure, the one or more collision parameters include relative position of each of one or more autonomous robots 110 with respect to each other, free space between each of one or more autonomous robots 110, position, anticipated position and speed of each of the one or more autonomous robots 110, one or more obstacles in vicinity of each of the one or more autonomous robots 110 and the like. Further, the action performing module 226 performs one or more actions based on the determined one or more collision parameters, a threshold distance, the received set of commands and the determined one or more situational parameters by using the robot management based AI model to prevent collision of the one or more autonomous robots 110 while moving on navigation path. In an embodiment of the present disclosure, the one or more autonomous robots 110 avoid obstacles, collision with each other and the like. Further, obstacle information may be given prior or emerge as the heterogeneous swarm is moving. In an embodiment of the present disclosure, the one or more autonomous robots 110 collaboratively and autonomously goes from the source to the destination via collision free trajectories by performing the one or more actions. The collision free trajectories simulate a schooling behavior. In an exemplary embodiment of the present disclosure, the one or more actions include move left, move upward, move right, move downward, stay still and the like. In an embodiment of the present disclosure, the action performing module 226 further enables cohesion while providing a collision free navigation path for each of the one or more autonomous robots 110. As each of the one or more autonomous robots 110 are operated independently, the autonomous robot collision may be prevented through a cohesion force mechanism based on the threshold distance. In an embodiment of the present disclosure, each of the one or more autonomous robots 110 in a swarm feels an attractive force to each other when autonomous robots go beyond of the threshold distance but start repelling while the autonomous robots are inside the threshold distance, thereby always maintain a swarm formation without colliding with each other. Further, the action performing module 226 allows the one or more autonomous robots 110 to move cooperatively while maintaining relative position and velocity matching while flying from point A to point B in defined territory. The heterogeneous swarm moves as a group but doesn't collide as they hover around a point.

The task optimization module 228 is configured to determine one or more task parameters by using the one or more sensors 112 and the robot management based AI model upon performing the one or more tasks at the detected one or more targets. In an exemplary embodiment of the present disclosure, the one or more task parameters include number of tasks executed by the autonomous robot at the detected one or more targets, images, videos and audios captured by the autonomous robots, one or more objects in vicinity of the detected one or more targets, payload used and the like. Further, the task optimization module 228 broadcasts the determined one or more task parameters to each of the one or more autonomous robots 110. In an embodiment of the present disclosure, the determined one or more task parameters are broadcasted via the communication network 108. In an embodiment of the present disclosure, the one or more task parameters are compressed and encrypted before broadcasting to maintain data privacy. The task optimization module 228 determines one or more optimization parameters associated with the one or more autonomous robots 110 based on one or more responses of the broadcasted one or more task parameters by using the robot management based AI. In an exemplary embodiment of the present disclosure, the one or more optimization parameters include number of tasks executed by each of one or more autonomous robots 110 at the detected one or more targets, images, videos and audios captured by each of one or more autonomous robots 110, a set of objects in vicinity of the detected one or more targets, payload used by each of one or more autonomous robots 110 and the like. Furthermore, the task optimization module 228 optimizes the received set of commands based on the determined one or more robotic capabilities, the captured one or more positional parameters, the determined one or more situational parameters, the one or more target parameters, the predefined allocation information, one or more emergency commands and the determined one or more optimization parameters by using the robot management based AI model to efficiently perform the one or more tasks. In an embodiment of the present disclosure, at specific times during the mission, the one or more autonomous robots 110 in the heterogeneous swarm sync up, such that autonomous robots within communication range may receive status update of each other, and thus of the heterogeneous swarm as a whole.

In an embodiment of the present disclosure, the synthetic simulation module 230 is configured to create a high-fidelity representation of the one or more autonomous robots 110 in a three-dimensional (3D) space to test, replay dynamic behavior of the one or more autonomous robot or a combination thereof. In an embodiment of the present disclosure, the synthetic simulation module 230 is configured in the one or more electronic devices 104 and operatively coupled to the human-machine interface via the communication network 108. In an exemplary embodiment of the present disclosure, the created high-fidelity representation of the one or more autonomous robots 110 in the three-dimensional (3D) space corresponds to a virtual simulation environment. Further, the synthetic simulation module 230 creates one or more virtual tasks and test hypothesis in the virtual simulation environment. The one or more virtual tasks correspond to mission. In an embodiment of the present disclosure, the operator may create the one or more virtual tasks and test the hypothesis in a rich simulation environment using the human machine interface 102. The synthetic simulation module 230 trains the robot management based AI model in the virtual simulation environment based on one or more simulation rules. In an embodiment of the present disclosure, the operator may simulate swarming missions through synthetic environments prior to the mission and get a feel of what the sessions may emerge like. The operator may interface with the heterogeneous swarm over a two-dimensional screen with point and click interface, or through virtual and augmented reality interfaces for enhanced and contextual situational awareness. In an embodiment of the present disclosure, such missions are prepared by the operator in the GCS. Further, the synthetic simulation module 230 test, develop or a combination thereof the human machine interface (102) for training the operator. In an embodiment of the present disclosure, the developed and tested human machine interface 102 becomes a training tool for the operator.

Further, the live data detection module 232 is configured to detect one or more live parameters associated with the autonomous robots at real-time by using the one or more sensors 112 and the robot management based AI model. In an exemplary embodiment of the present disclosure, the one or more live parameters include health, flight mode, current routine, routine data, speed, battery of the autonomous robot, tasks performed by the autonomous robot, number of autonomous robots in vicinity of the autonomous robots, multimedia data of surrounding environment and the like. The live data detection module 232 outputs the detected one or more live parameters to the human machine interface 102 associated with one or more electronic devices 104. In an embodiment of the present disclosure, the human machine interface 102 allows the operator to be able to command and monitor the one or more autonomous robots 110 forming the heterogeneous swarm using high level commands. The operator is not required to control individual autonomous robots in the heterogeneous swarm. In an embodiment of the present disclosure, top-down sensor coverage, moving map top-view and view via ground control station are available for human-in-loop i.e., the operator to plan and monitor the one or more tasks. In an embodiment of the present disclosure, the swarm of the one or more autonomous robots 110 may be in touch with the GCS over the communication network 108, but the communication network 108 is not required, as the swarm of the one or more autonomous robots 110 may operate without having the communication network 108 with the GCS. The operator may clearly check the interaction of the one or more autonomous robots 110 for situational awareness. In an embodiment of the present disclosure, distance between the one or more autonomous robots 110 may easily be tracked.

In an embodiment of the present disclosure, the operator may provide emergency commands to the one or more autonomous robots 110. For example, the emergency commands may be "abort mission", "return back" and the like. Further, the one or more autonomous robots 110 may perform tasks corresponding to the received emergency commands. In an embodiment of the present disclosure, the human operator may interface with the swarm of the one or more autonomous robots 110 over a 2D screen with point and click interface, or through virtual and augmented reality interfaces for enhanced and contextual situational awareness.

Figure 3:
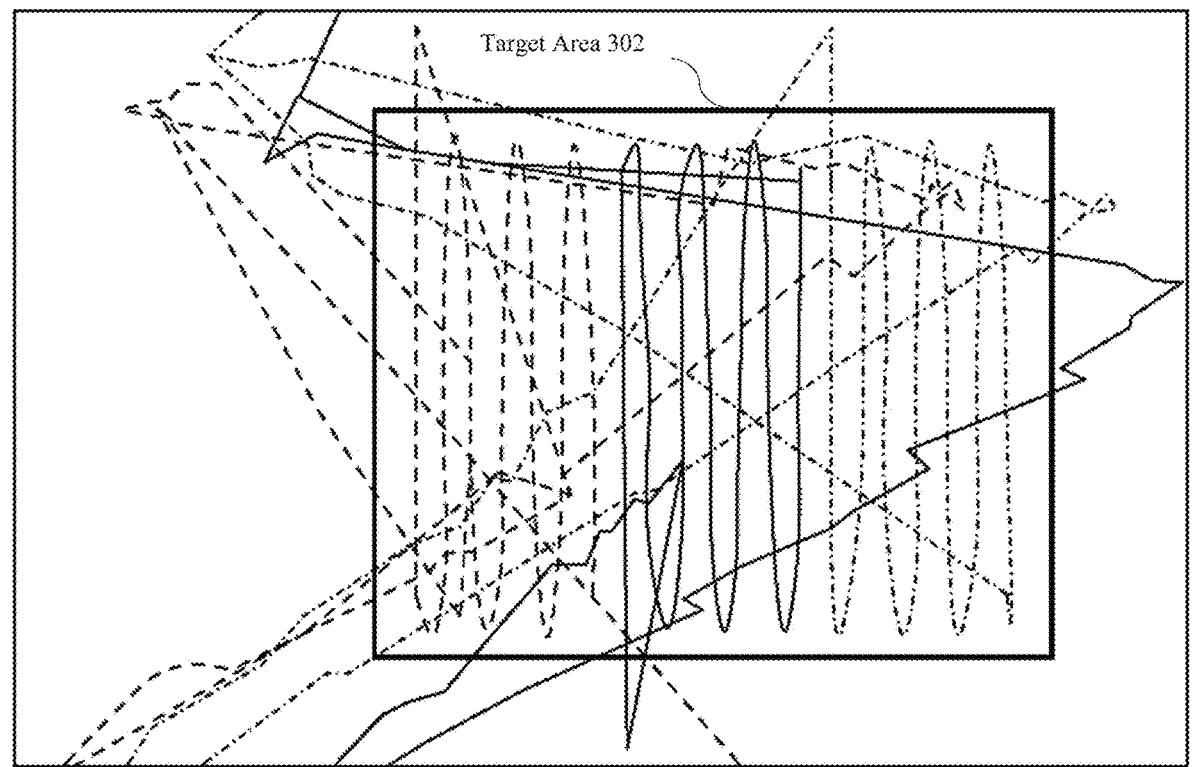
FIG. 3 is an exemplary pictorial representation depicting division of target area among one or more autonomous robots, in accordance with an embodiment of the present disclosure.

FIG. 3 is an exemplary pictorial representation depicting division of target area among one or more autonomous robots 110, in accordance with an embodiment of the present disclosure. In an embodiment of the present disclosure, FIG. 3 depicts top-down tracks of forage phase of swarm-mission. The operator on loop issues the one or more high-level commands, such as a target area 302 to be searched by the heterogeneous swarm of the one or more autonomous robots 110. Each of the one or more autonomous robots 110 performs low level decision making to collaboratively divide the target area 302 amongst each other. For example, in FIG. 3, three autonomous robots divide the target area 302 amongst each other to have equal effort division between the three autonomous robots. Further, solid line depicts tracks of first autonomous robot, round dot line depicts tracks of second autonomous robot and dash line depicts tracks of third autonomous robot, as shown in FIG. 3.

Figure 4A:
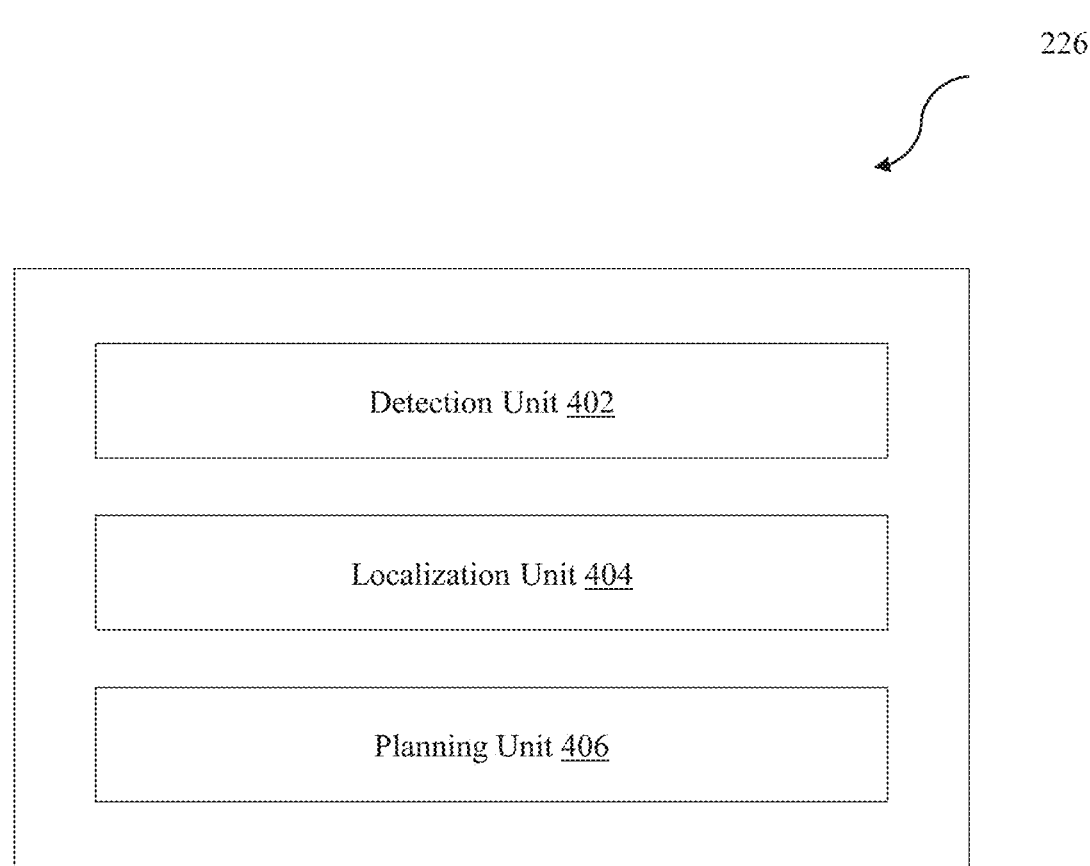
FIG. 4A is a block diagram illustrating an exemplary action performing module, in accordance with an embodiment of the present disclosure.
Figure 4B:
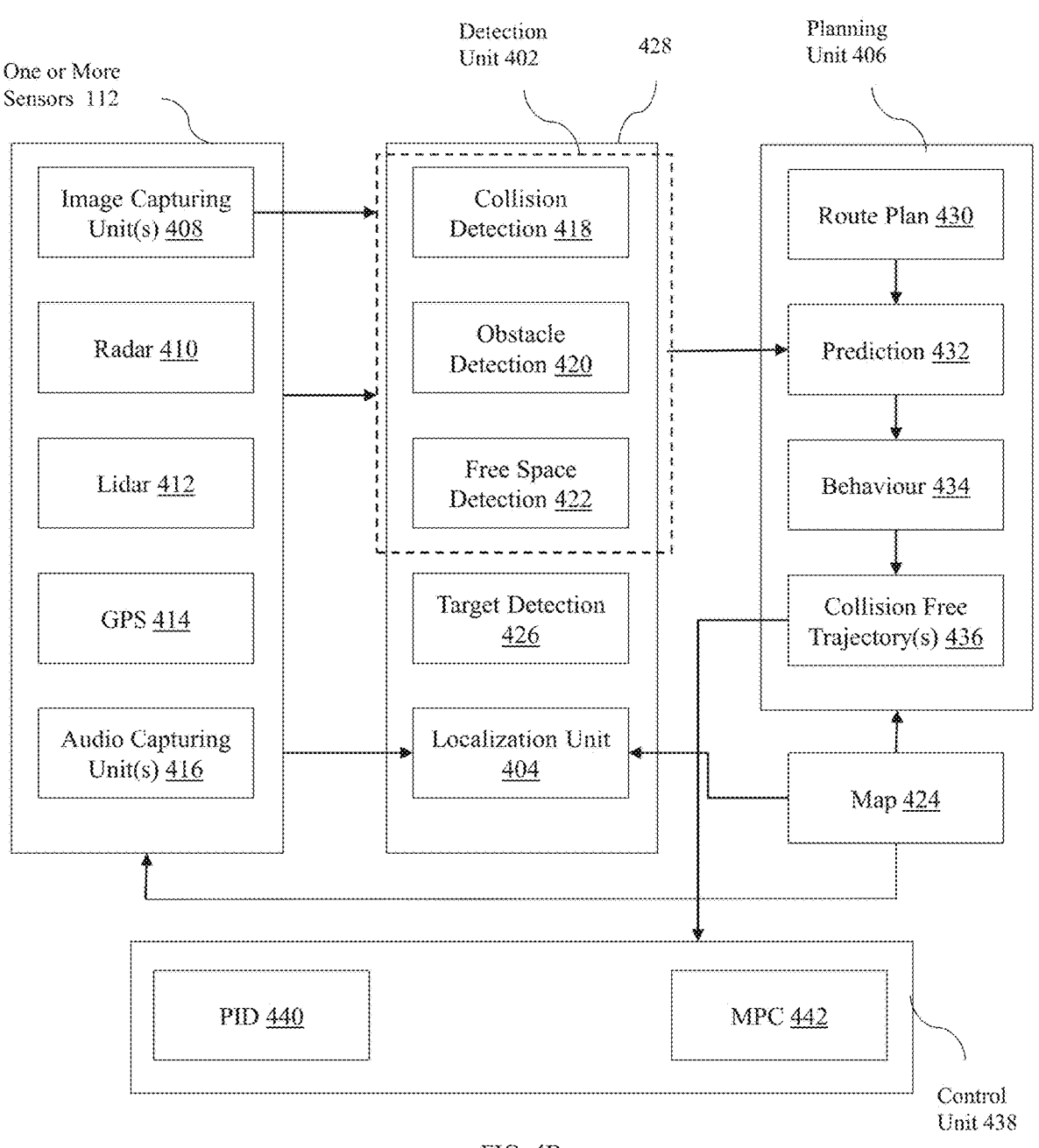
FIG. 4B is a block diagram illustrating an exemplary operation of the AI based computing system for managing heterogeneous network-agnostic swarm of robots, in accordance with an embodiment of the present disclosure.

FIG. 4A is a block diagram illustrating an exemplary action performing module 226, in accordance with an embodiment of the present disclosure. Further, FIG. 4B is a block diagram illustrating an exemplary operation of the AI based computing system 106 for managing heterogeneous network-agnostic swarm of robots, in accordance with an embodiment of the present disclosure. For the sake of brevity, FIGS. 4A-4B have been explained together.

The action performing module 226 includes a detection unit 402, a localization unit 404 and a planning unit 406, as shown in FIG. 4A. In an embodiment of the present disclosure, FIG. 4B depicts workflow indicating management of heterogeneous network-agnostic swarm of robots. Further, the one or more sensors 112, such as the one or more image capturing units 408, Radar 410, Lidar 412, GPS 414, one or more audio capturing units 416 and the like to capture position of the autonomous robot, anticipated position of the autonomous robot, one or more images of the one or more targets, one or more videos of the one or more targets, a set of images of other autonomous robots in proximity, a set of videos of the other autonomous robots, one or more audios of surrounding environment and the like. Furthermore, one or more robotic capabilities, such as type of payload, type of sensors, speed, weight holding capacity, configuration, battery level, class, weight of the autonomous robot and the like along with the one or more positional parameters are broadcasted to each of the one or more autonomous robots 110 for determining the one or more situational parameters. In an exemplary embodiment of the present disclosure, the one or more positional parameters include type of payload, type of sensors, speed, weight capacity, class, battery level of each of the one or more autonomous robots 110, position of each of the one or more autonomous robots 110, anticipated position of each of the one or more autonomous robots 110, one or more images of the one or more targets, one or more videos of the one or more targets, a set of images of the one or more autonomous robots 110, a set of videos of the one or more autonomous robots 110, relative position of the autonomous robots with respect to each of the one or more autonomous robots 110, one or more audios of surrounding environment and the like. Further, the detection unit 402 performs collision detection 418, obstacle detection 420 and the free space detection 422 to determine the one or more collision parameters based on the determined one or more situational parameters by using the robot management based AI model. In an exemplary embodiment of the present disclosure, the one or more collision parameters include relative position of each of one or more autonomous robots 110 with respect to each other, free space between each of one or more autonomous robots 110, position, anticipated position and speed of each of the one or more autonomous robots 110, one or more obstacles in vicinity of each of the one or more autonomous robots 110 and the like. In an embodiment of the present disclosure, the localization unit 404 determines relative position of each of the one or more autonomous robots 110 with respect to each other on map 424. The map 424 may be geo-referenced map. Further, the target detection module 220 performs target detection 426 operation to detect the one or more targets based on the received set of commands, the determined one or more robotic capabilities, the captured one or more positional parameters and the determined one or more situational parameters by using the robot management based AI model. In an embodiment of the present disclosure, the detection unit 402, the target detection 426 operation and the localization unit 404 corresponds to a perception unit 428. Further, the planning unit 406 generated a route plan 430 based on the received set of commands and the GPS. In an embodiment of the present disclosure, the planning unit 406 performs prediction 432 and behavior 434 operation where the one or more autonomous robots 110 share their velocity vector with each other i.e., current location along with location they are pointing and velocity they are moving. Further, in 'de-conflicting' solution and collision avoidance, the planning unit 406 determines current position and anticipated position of the autonomous robot in the next few times steps based on result of the prediction 432 and behavior 434 operation for collision avoidance. In an embodiment of the present disclosure, the one or more autonomous robots 110 collaboratively and autonomously goes from the source to the destination via one or more collision free trajectories 436 by performing the one or more actions. The one or more collision free trajectories 436 simulate a schooling behavior. In an embodiment of the present disclosure, control unit 438 corresponding to the task performing module 224 performs the one or more tasks at the detected one or more targets by using Proportional Integral and Differential (PID) 440 and Model Predictive Control (MPC) 442. In an embodiment of the present disclosure, PID and MPC are examples of types of control algorithms used. The control algorithms are mostly feature of low-level drone controllers.

Figure 5:
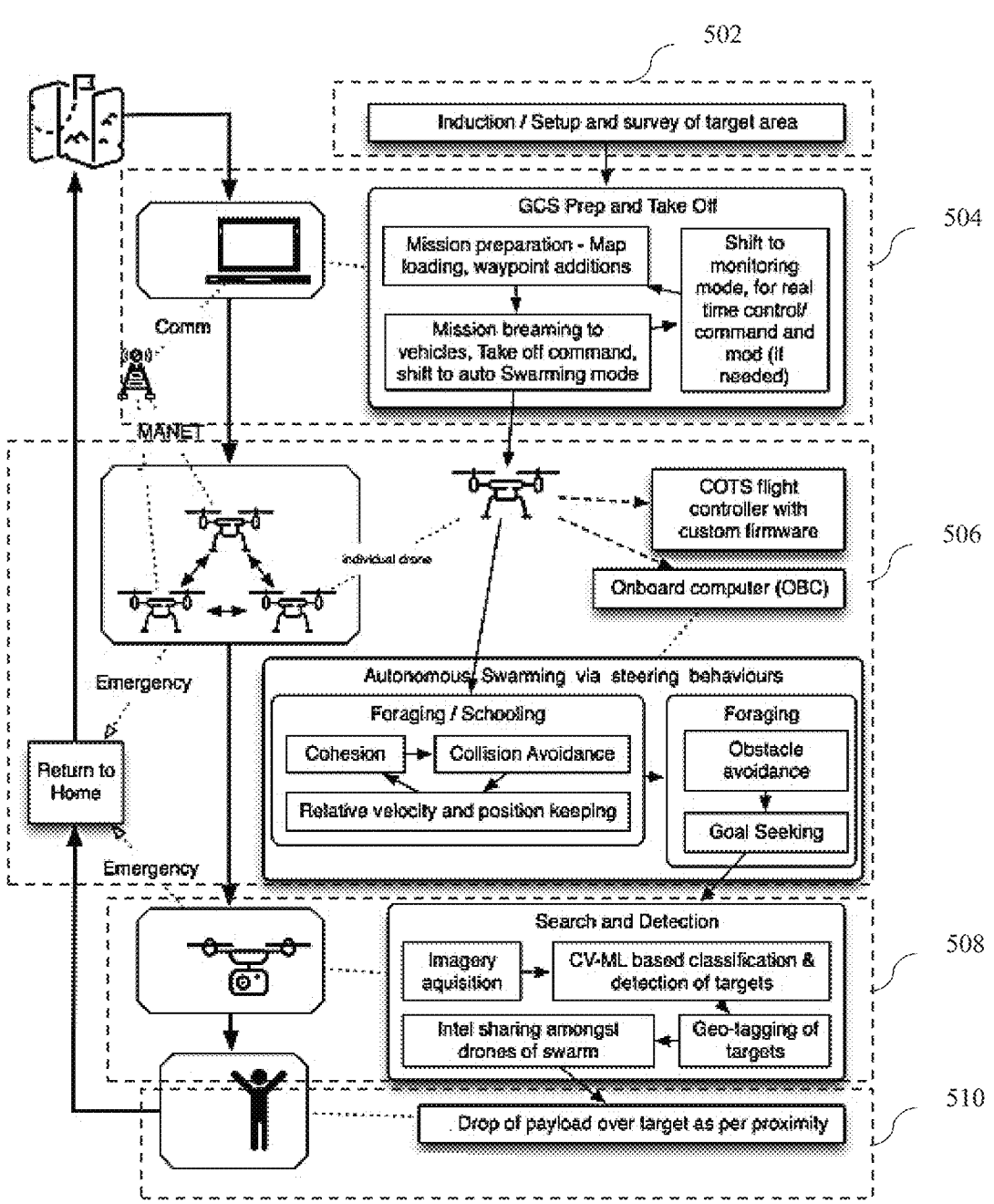
FIG. 5 is a pictorial depiction illustrating an exemplary operation of the AI based computing system for managing heterogeneous network-agnostic swarm of robots, in accordance with another embodiment of the present disclosure.

FIG. 5 is a pictorial depiction illustrating an exemplary operation of the AI based computing system 106 for managing heterogeneous network-agnostic swarm of robots, in accordance with another embodiment of the present disclosure. In an embodiment of the present disclosure, FIG. 5 depicts concepts of operations of autonomy suite utilization. FIG. 5 shows a flow diagram that indicate utilization of a swarm mission. At step 502, the operator setup and survey target area. Further, at step 504, the operator prepares a mission on the Ground Control Station (GCS) on the basis of the geo-referenced map. In an embodiment of the present disclosure, the mission is prepared by giving the one or more high-level commands. In step 504, the mission is prepared by map loading and waypoint additions. Furthermore, multiple commands, such as mission breaming to vehicles, take off command and shift to auto swarming mode is provided. In an embodiment of the present disclosure, the heterogeneous swarm of the one or more autonomous robots 110 shift to monitoring model for real time control or command, if required. At step 506, swarm emergence of phases, such as flock, school, forage and the like while demonstrating behaviours, such as cohesion, collision avoidance and the like. In an embodiment of the present disclosure, autonomous swarming is achieved via steering behaviours and relative velocity and position is maintained by the heterogeneous swarm of the one or more autonomous robots 110 while seeking goal (one or more targets) and avoiding obstacles. In an embodiment of the present disclosure, the autonomous robot, such as drone, corresponds to Consumer Off the Shelf (COTS) flight controller with custom firmware, Onboard Computer (OBC), and the like, as shown in FIG. 5. In an embodiment of the present disclosure, COTS is a low-level drone controller that commands the drone. At step 508, the heterogeneous swarm may be in touch with the GCS over the communication network 108, but the communication network 108 is not required as the heterogeneous swarm may operate without having a network connection with the GCS. In an embodiment of the present disclosure, the swarm of the one or more autonomous robots 110 may use imagery acquisition, computer vision and machine learning based classifications for searching and detecting the one or more targets. At step 510, the heterogeneous swarm may utilise a payload like a camera to detect targets by employing computer vision and machine learning techniques and addresses the detection with a payload drop. For example, a humanitarian aid is dropped during an emergency scenario, such as earthquake. When the payload is dropped, the heterogeneous swarm returns to home location.

FIG. 6 is a process flow diagram illustrating an exemplary AI based method for managing heterogeneous network-agnostic swarm of robots, in accordance with an embodiment of the present disclosure. In an embodiment of the present disclosure, the AI based method 600 is performed by an autonomous robot from one or more autonomous robots 110. The one or more autonomous robots 110 collectively form a heterogeneous swarm to collaboratively perform one or more tasks. At step 602, a set of commands is received from a human machine interface 102 associated with one or more electronic devices 104 to perform one or more tasks via one or more autonomous robots 110 at one or more targets. The human machine interface 102 is configured in the one or more electronic devices 104. In an embodiment of the present disclosure, an operator uses human machine interface 102 to provide one or more high-level commands for enabling the one or more autonomous robots 110 to perform the one or more tasks. In an embodiment of the present disclosure, the one or more high-level commands are prepared on a Ground Control Station (GCS) on the basis of the geo-reference map. The one or more high-level commands enable the one or more autonomous robots 110 to perform the one or more tasks as a swarm. In an embodiment of the present disclosure, the one or more autonomous robots 110 collectively form a heterogeneous swarm to collaboratively perform the one or more tasks. The one or more high-level commands are issued by the human to the heterogeneous swarm, such that each of the one or more autonomous robots 110 act cooperatively to do lower level taskings to achieve the one or more high-level commands in a cooperative manner. The one or more tasks are performed concurrently or in stages. For example, the one or more tasks include rescue survivors, drop medical kit, drop food boxes, destroy targets, capture images and the like. In an embodiment of the present disclosure, the human machine interface 102 also derives the set of commands from the one or more high-level commands provided by the operator for performing the one or more tasks via the one or more autonomous robots 110. The human machine interface 102 is deployed at full swarm level. The set of commands are machine readable commands which enables the one or more autonomous robots 110 to collaboratively perform the one or more tasks. In an embodiment of the present disclosure, the set of commands correspond to a mission. In an exemplary embodiment of the present disclosure, the one or more high-level commands include a set of predefined commands representing the one or more tasks to be performed by the one or more autonomous robots 110, source, destination, time of performing the one or more tasks, role and speed of each of the one or more autonomous vehicles, altitude from ground, one or more predefined conditions, a navigation path from the source to the destination, boundary fence, one or more intermediate locations, the one or more targets, safe area and danger area. In an embodiment of the present disclosure, the one or more high-level commands are provided on the geo-referenced map. For example, the set of predefined commands may be arm, deliver package, flock, forage, land, move to position, school, take off, wait for Global Positioning System (GPS), wait, find survivors, drop payload and the like. In an embodiment of the present disclosure, the navigation path is provided by the operator. In another embodiment of the present disclosure, the navigation path is generated by the human machine interface 102 based on the source, the destination and the GPS. In an exemplary embodiment of the present disclosure, the one or more electronic devices 104 may include a laptop computer, desktop computer, tablet computer, smartphone, wearable device, smart watch, a digital camera and the like. For example, the wearable device may be an augmented reality headset, virtual reality headset and the like. In an embodiment of the present disclosure, the human machine interface 102 communicates with an AI based computing system 106 via a communication network 108.

In an embodiment of the present disclosure, each of the one or more autonomous robots 110 in the heterogeneous swarm know current swarming state while moving from the source to the destination. The heterogeneous swarm transitions to a new state and that cascades to swarming entities moving on to other roles when the one or more predefined conditions are met, such as enough prerequisite numbers have reached the destination. In an embodiment of the present disclosure, the one or more predefined conditions are parameterised and configured before the mission. In an embodiment of the present disclosure, each of the one or more autonomous robots 110 may behave as the heterogeneous swarm as they regularly sync up each other's locations in real time.

At step 604, one or more robotic capabilities associated with autonomous robot are determined based on the received set of commands and predefined robotic information. In an exemplary embodiment of the present disclosure, the one or more robotic capabilities include type of payload, type of sensors, speed, weight holding capacity, configuration, battery level, class, weight of the autonomous robot and the like. For example, the class of the autonomous robot may be 20 kg hexacopters with 10 kg quadcopters, Belluga (BLL), Nimbus (NMB), Mackeral (MCL), an unmanned vehicle with camera fitting, quadcopter, hexacopter and ground unmanned vehicle with different working speed and the like. In an exemplary embodiment of the present disclosure, the type of the payload is camera payload, robots, medical kit, communication enabling antenna payload, weapon and the like. In an embodiment of the present disclosure, each of the one or more autonomous robots 110 may accommodate other autonomous robots in accordance with time and speed.

At step 606, one or more positional parameters are captured by using one or more sensors 112. In an exemplary embodiment of the present disclosure, the one or more positional parameters include position of the autonomous robot, anticipated position of the autonomous robot, one or more images of the one or more targets, one or more videos of the one or more targets, a set of images of other autonomous robots in proximity, a set of videos of the other autonomous robots, one or more audios of surrounding environment and the like. In an embodiment of the present disclosure, the one or more sensors 112 are fixed with each of the one or more autonomous robots 110 to capture the one or more positional parameters. For example, the one or more sensors 112 include one or more image capturing units, one or more audio capturing units, Global Positioning System (GPS), Lidar, Radar and the like.

At step 608, the determined one or more robotic capabilities and the captured one or more positional parameters are broadcasted to each of the one or more autonomous robots 110. In an embodiment of the present disclosure, the determined one or more robotic capabilities and the captured one or more positional parameters are broadcasted via the communication network 108. In an embodiment of the present disclosure, the determined one or more robotic capabilities and the captured one or more positional parameters are compressed and encrypted before broadcasting to maintain data privacy.

At step 610, one or more situational parameters associated with the one or more autonomous robots 110 are determined based on one or more responses of the broadcasted one or more robotic capabilities and the broadcasted one or more positional parameters, the received set of commands, the determined one or more robotic capabilities and the captured one or more positional parameters by using a robot management based Artificial Intelligence (AI) model. In an exemplary embodiment of the present disclosure, the one or more situational parameters include type of payload, type of sensors, speed, weight capacity, class, battery level of each of the one or more autonomous robots 110, position of each of the one or more autonomous robots 110, anticipated position of each of the one or more autonomous robots 110, one or more images of the one or more targets, one or more videos of the one or more targets, a set of images of the one or more autonomous robots 110, a set of videos of the one or more autonomous robots 110, relative position of the autonomous robots with respect to each of the one or more autonomous robots 110, one or more audios of surrounding environment and the like. Since each of the one or more autonomous robots 110 have different type of payload, type of sensors, speed, weight holding capacity, configuration, class, weight and the like, the one or more autonomous robots 110 form heterogeneous swarm. For example, when the class of the one or more autonomous robots 110 are same and the type of payloads associated with the one or more autonomous robots 110 are different, the one or more autonomous robots 110 may still form the heterogeneous swarms.

In an embodiment of the present disclosure, heterogeneity in the form of different types of payloads results in the one or more autonomous robots 110 playing certain roles, such as communication payload facilities communication, and may not do search, which requires cameras systems. Further, autonomous robot with a camera may look for targets and share with swarm of the one or more autonomous robots 110. For example, autonomous robots carrying a mission payload may then service the one or more targets. In an embodiment of the present disclosure, roles are assigned to different autonomous robots on the basis of their configuration, and they play their roles accordingly. For example, in a honey-bee swarm, there are worker bees, warrior bees and the like which play different roles. Further, heterogeneity may also be in terms of similar class of autonomous robots, such as quadcopter and hexacopter means they have at least matching speeds and the like. Thus, envelope of speed is similar, but flight time may vary. In another example, bigger Integrated Circuits (IC) engine powered hexacopters act as motherships carrying small battery powered multicopters as payload, and then the heterogeneous swarm cascades as small quads are deployed. Furthermore, across class swarming, such as mix and match of classes (for example, fixed wing+multicopter) is also evolving, where certain aspects, such as collision avoidance may still happen, and faster unit may try to accommodate smaller units. In an exemplary embodiment of the present disclosure, this may also be done with ground vehicle as a swarm entity, where top hovering swarm entities stay in a relation with a slower moving ground unit, such as a manned vehicle on ground that is a part of swarm as part of a Manned-Unmanned Teaming (MUMT). Alternatively, a fast-moving manned vehicle in air for MUMT between aerial assets. In an embodiment of the present disclosure, the heterogeneous swarm corresponds to swarm of manned and unmanned autonomous vehicles to achieve the MUMT characteristics.

At step 612, the one or more targets are detected based on the received set of commands, the determined one or more robotic capabilities, the captured one or more positional parameters and the determined one or more situational parameters by using the robot management based AI model. In an embodiment of the present disclosure, the one or more targets refer to an object, point of attention or area of interest for performing the one or more tasks. For example, the object may be aircraft, ship, any ground vehicle, human beings, a piece of land and the like. In an embodiment of the present disclosure, the robot management based AI model may correspond to computer vision and machine learning techniques.

At step 614, the one or more tasks and the detected one or more targets are allocated among the one or more autonomous robots 110 based on the received set of commands, the determined one or more robotic capabilities, the captured one or more positional parameters, the determined one or more situational parameters, one or more target parameters and predefined allocation information by using the robot management based AI model. In an exemplary embodiment of the present disclosure, the one or more target parameters include number of the one or more target, size of each of the one or more targets, sensor footprint corresponding to each of the one or more autonomous robots 110 and the like. For example, when the one or more autonomous robots 110 reach the detected one or more targets, the one or more autonomous robots 110 collaboratively divide the one or more target area amongst themselves and start a forage behavior, thus covering the area looking for the one or more targets. In an example, when the target area is of 300 square feet and the number of the one or more autonomous robots 110 is 5, the target area is divided into 60 square feet, such that each of the one or more autonomous robots 110 get 60 square feet area.

At step 616, the one or more tasks at the detected one or more targets are performed based on allocation of the one or more tasks and the detected one or more tasks among the one or more autonomous robots 110 by using the robot management based AI model. In an embodiment of the present disclosure, the one or more autonomous robots 110 perform autonomous take-off and demonstrates a flocking behaviour, like a flock of birds behaviour cohesively. For example, swarm of the one or more autonomous robots 110 may utilise the payload, such as a camera to detect the one or more targets and address the detection with a payload drop, such as humanitarian aid during an emergency scenario like an earthquake. In an embodiment of the present disclosure, the payload is dropped based on speed and location of the one or more autonomous robots 110, location of the one or more targets, wind speed and the like. For example, the one or more autonomous robots 110 in the heterogeneous swarm know how many of autonomous robots are present at an area while sync up. Further, the 'area' is divided by the sensor footprint i.e., swath of the sensor, to be used for search. Furthermore, the area is divided into a length that needs to be holistically traversed. The 'length' is then divided by the number of the one or more autonomous robots 110 present, which gives start points along this length-line along length-segments. Further, each of the one or more autonomous robots 110 in the heterogeneous swarm proceed to their respective assigned length segment and traverse this. In an embodiment of the present disclosure, the predefined allocation information include a set of rules for assignment. For example, the assignment is based on a concept of 'seniority'. A drone with smaller Internet Protocol (IP) address may be assigned first position.

Further, the method 600 includes determining one or more collision parameters based on the determined one or more situational parameters by using the robot management based AI model. In an exemplary embodiment of the present disclosure, the one or more collision parameters include relative position of each of one or more autonomous robots 110 with respect to each other, free space between each of one or more autonomous robots 110, position, anticipated position and speed of each of the one or more autonomous robots 110, one or more obstacles in vicinity of each of the one or more autonomous robots 110 and the like. Further, the method 600 includes performing one or more actions based on the determined one or more collision parameters, a threshold distance, the received set of commands and the determined one or more situational parameters by using the robot management based AI model to prevent collision of the one or more autonomous robots 110 while moving on navigation path. In an embodiment of the present disclosure, the one or more autonomous robots 110 avoid obstacles, collision with each other and the like. Further, obstacle information may be given prior or emerge as the heterogeneous swarm is moving. In an embodiment of the present disclosure, the one or more autonomous robots 110 collaboratively and autonomously goes from the source to the destination via collision free trajectories by performing the one or more actions. The collision free trajectories simulate a schooling behavior. In an exemplary embodiment of the present disclosure, the one or more actions include move left, move upward, move right, move downward, stay still and the like. In an embodiment of the present disclosure, the method 600 enables cohesion while providing a collision free navigation path for each of the one or more autonomous robots 110. As each of the one or more autonomous robots 110 are operated independently, the autonomous robot collision may be prevented through a cohesion force mechanism based on the threshold distance. In an embodiment of the present disclosure, each of the one or more autonomous robots 110 in a swarm feels an attractive force to each other when autonomous robots go beyond of the threshold distance but start repelling while the autonomous robots are inside the threshold distance, thereby always maintain a swarm formation without colliding with each other. Further, the method 600 includes allowing the one or more autonomous robots 110 to move cooperatively while maintaining relative position and velocity matching while flying from point A to point B in defined territory. The heterogeneous swarm moves as a group but doesn't collide as they hover around a point.

Furthermore, the method 600 includes determining one or more task parameters by using the one or more sensors 112 and the robot management based AI model upon performing the one or more tasks at the detected one or more targets. In an exemplary embodiment of the present disclosure, the one or more task parameters include number of tasks executed by the autonomous robot at the detected one or more targets, images, videos and audios captured by the autonomous robots, one or more objects in vicinity of the detected one or more targets, payload used and the like. Further, the method 600 includes broadcasting the determined one or more task parameters to each of the one or more autonomous robots 110. In an embodiment of the present disclosure, the determined one or more task parameters are broadcasted via the communication network 108. In an embodiment of the present disclosure, the one or more task parameters are compressed and encrypted before broadcasting to maintain data privacy. The method 600 includes determining one or more optimization parameters associated with the one or more autonomous robots 110 based on one or more responses of the broadcasted one or more task parameters by using the robot management based AI. In an exemplary embodiment of the present disclosure, the one or more optimization parameters include number of tasks executed by each of one or more autonomous robots 110 at the detected one or more targets, images, videos and audios captured by each of one or more autonomous robots 110, a set of objects in vicinity of the detected one or more targets, payload used by each of one or more autonomous robots 110 and the like. Furthermore, the method 600 includes optimizing the received set of commands based on the determined one or more robotic capabilities, the captured one or more positional parameters, the determined one or more situational parameters, the one or more target parameters, the predefined allocation information, one or more emergency commands and the determined one or more optimization parameters by using the robot management based AI model to efficiently perform the one or more tasks. In an embodiment of the present disclosure, at specific times during the mission, the one or more autonomous robots 110 in the heterogeneous swarm sync up, such that autonomous robots within communication range may receive status update of each other, and thus of the heterogeneous swarm as a whole.

In an embodiment of the present disclosure, the method 600 includes creating a high-fidelity representation of the one or more autonomous robots 110 in a three-dimensional (3D) space to test, replay dynamic behavior of the one or more autonomous robot or a combination thereof. In an exemplary embodiment of the present disclosure, the created high-fidelity representation of the one or more autonomous robots 110 in the three-dimensional (3D) space corresponds to a virtual simulation environment. Further, the method 600 includes creating one or more virtual tasks and test hypothesis in the virtual simulation environment. The one or more virtual tasks correspond to mission. In an embodiment of the present disclosure, the operator may create the one or more virtual tasks and test the hypothesis in a rich simulation environment using the human machine interface 102. The method 600 includes training the robot management based AI model in the virtual simulation environment based on one or more simulation rules. In an embodiment of the present disclosure, the operator may simulate swarming missions through synthetic environments prior to the mission and get a feel of what the sessions may emerge like. The operator may interface with the heterogeneous swarm over a two-dimensional screen with point and click interface, or through virtual and augmented reality interfaces for enhanced and contextual situational awareness. In an embodiment of the present disclosure, such missions are prepared by the operator in the GCS. Further, human machine interface 102 is tested, developed or a combination thereof for training the operator. In an embodiment of the present disclosure, the developed and tested human machine interface 102 becomes a training tool for the operator.

Further, the method 600 includes detecting one or more live parameters associated with the autonomous robots at real-time by using the one or more sensors 112 and the robot management based AI model. In an exemplary embodiment of the present disclosure, the one or more live parameters include health, flight mode, current routine, routine data, speed, battery of the autonomous robot, tasks performed by the autonomous robot, number of autonomous robots in vicinity of the autonomous robots, multimedia data of surrounding environment and the like. The method 600 includes outputting the detected one or more live parameters to the human machine interface 102 associated with one or more electronic devices 104. In an embodiment of the present disclosure, the human machine interface 102 allows the operator to be able to command and monitor the one or more autonomous robots 110 forming the heterogeneous swarm using high level commands. The operator is not required to control individual autonomous robots in the heterogeneous swarm. In an embodiment of the present disclosure, top-down sensor coverage, moving map top-view and view via ground control station are available for human-in-loop i.e., the operator to plan and monitor the one or more tasks. In an embodiment of the present disclosure, the swarm of the one or more autonomous robots 110 may be in touch with the GCS over the communication network 108, but the communication network 108 is not required, as the swarm of the one or more autonomous robots 110 may operate without having the communication network 108 with the GCS. The operator may clearly check the interaction of the one or more autonomous robots 110 for situational awareness. In an embodiment of the present disclosure, distance between the one or more autonomous robots 110 may easily be tracked.

In an embodiment of the present disclosure, the operator may provide emergency commands to the one or more autonomous robots 110. For example, the emergency commands may be "abort mission", "return back" and the like. Further, the one or more autonomous robots 110 may perform tasks corresponding to the received emergency commands. In an embodiment of the present disclosure, the human operator may interface with the swarm of the one or more autonomous robots 110 over a 2D screen with point and click interface, or through virtual and augmented reality interfaces for enhanced and contextual situational awareness.

The AI based method 600 may be implemented in any suitable hardware, software, firmware, or combination thereof.

Figure 7A:
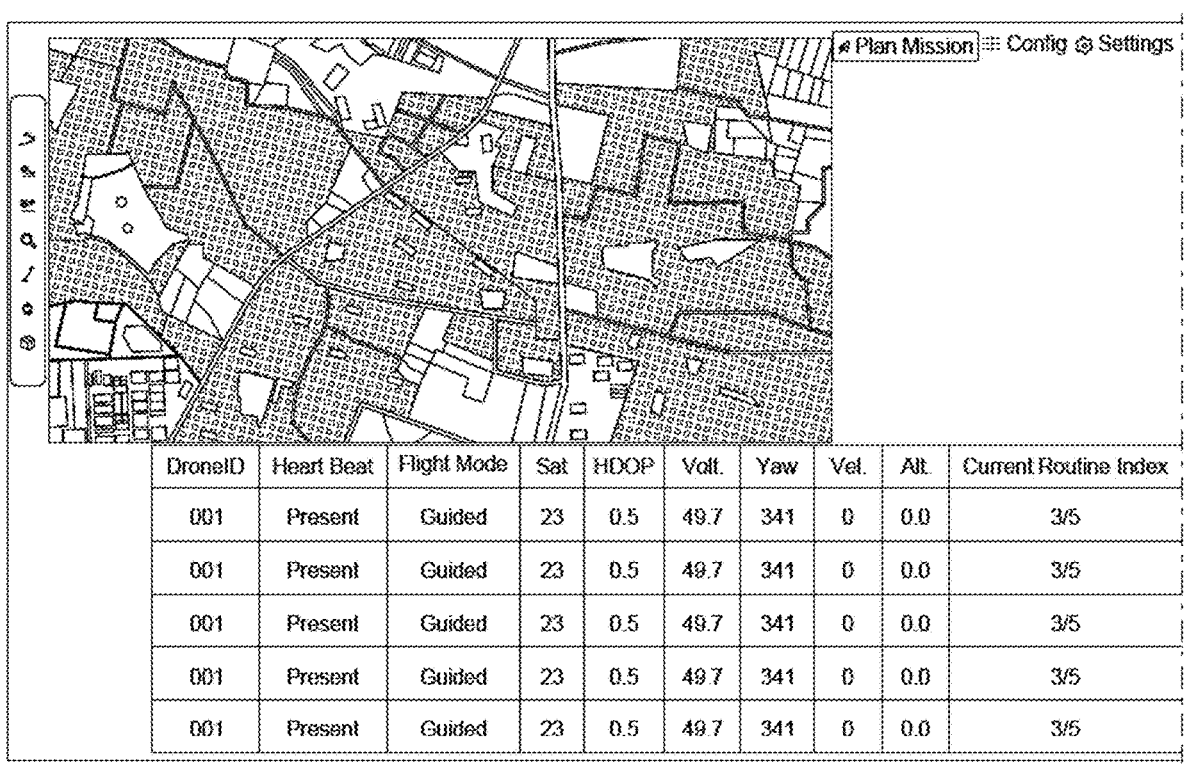
FIGS. 7A-7C are graphical user interface screens of the AI based computing system for managing heterogeneous network-agnostic swarm of robots, in accordance with an embodiment of the present disclosure.
Figure 7B:
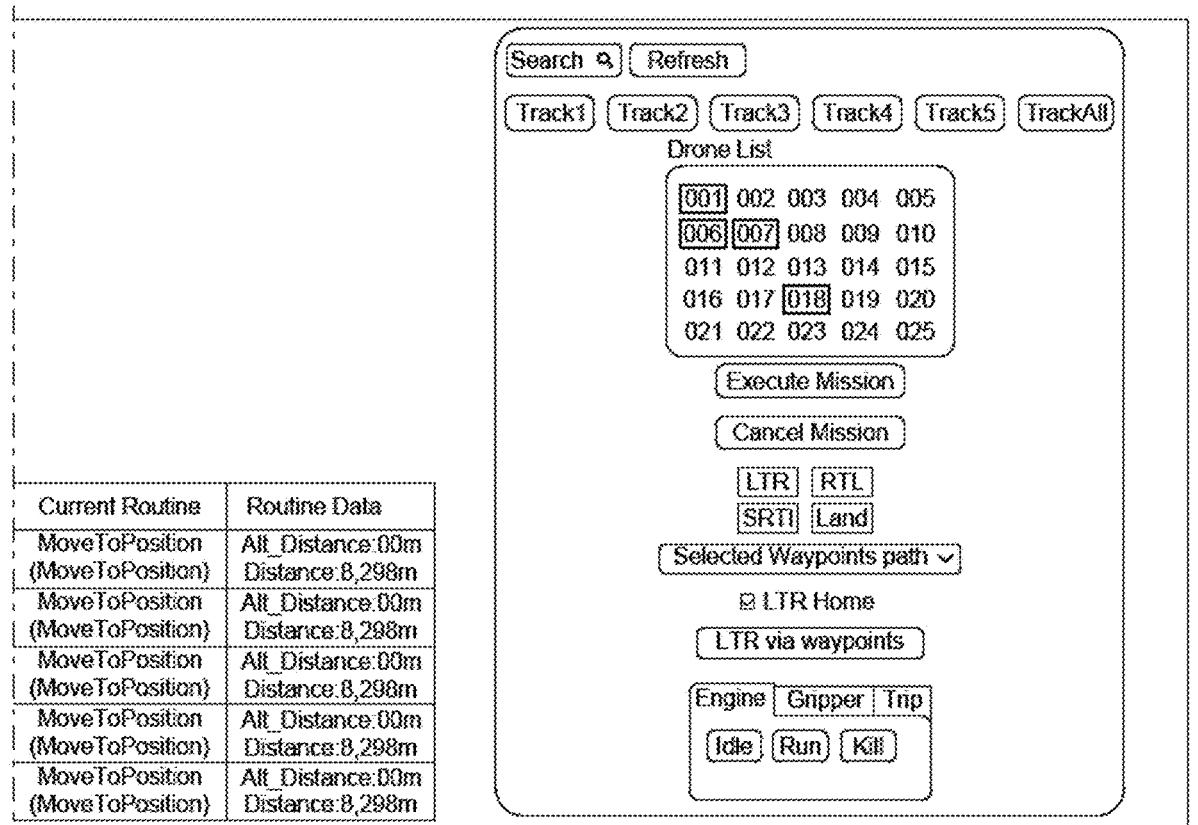
Figure 7C:
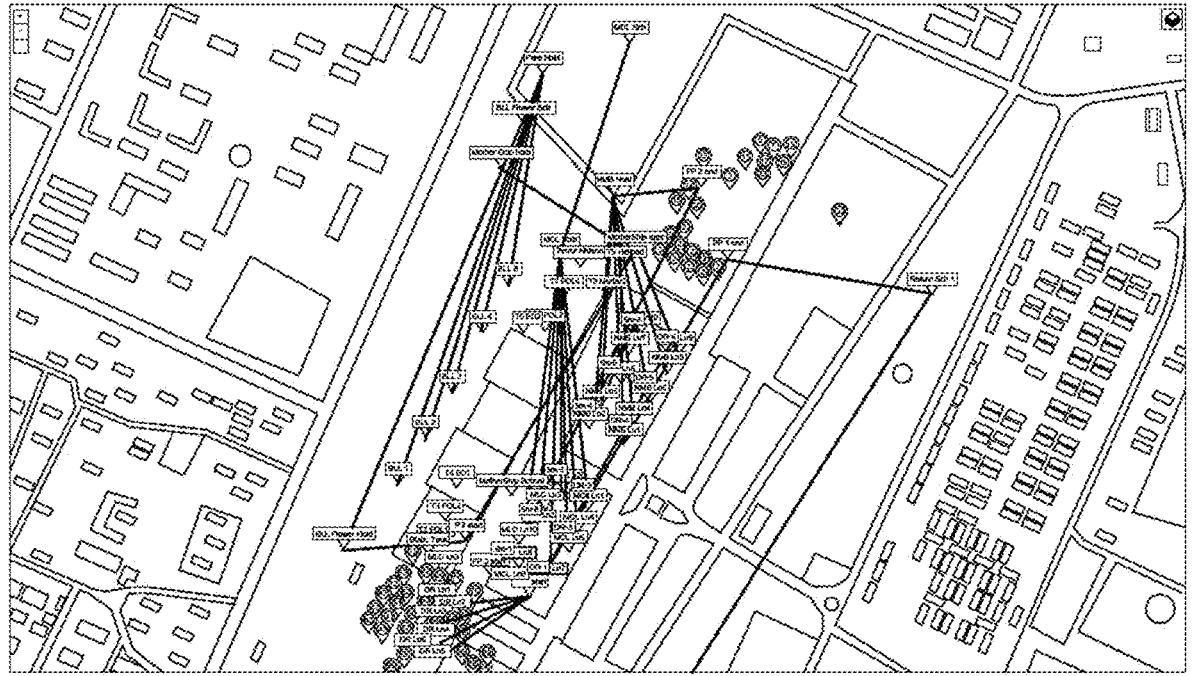

FIGS. 7A-7C are graphical user interface screens of the AI based computing system 106 for managing heterogeneous network-agnostic swarm of robots, in accordance with an embodiment of the present disclosure. FIGS. 7A-7B display a geo-referenced map on which the one or more high-level commands are provided by the operator, one or more sample routines on left, the one or more live parameters, one or more emergency controls on right, a table view showing individual drone patterns at the bottom and the like. FIG. 7C displays an image that shows complete situational awareness with multiple autonomous robots evolving over time. In an embodiment of the present disclosure, FIG. 7C shows dynamic evolution, as the one or more autonomous robots 110 move in different places at different time instance. In an embodiment of the present disclosure, the swarm under movement is heterogenous. For example, different drones like Belluga (BLL), Nimbus (NMB) and Mackeral (MCL). In another example, when same platform is configured for different roles by attaching different payloads, the swarm is heterogenous.

Thus, various embodiments of the present AI based computing system 106 provide a solution to manage heterogeneous network-agnostic swarm of robots. The AI based computing system 106 may be used in multiple fields of application, such as humanitarian aid and disaster relief, intelligence, surveillance, reconnaissance, agriculture, logistics, security and the like. The AI based computing system 106 enables a group of heterogenous un-manned systems of different class of Unmanned Aerial Vehicles (UAVs) to work autonomously and cooperatively as a single swarm for single or multiple tasks concurrently or in stages. In an embodiment of the present disclosure, the AI based computing system 106 is deployed at the level of specific individual class of UAVs for interfacing with single swarming system, and the human machine interface 102 is deployed at the full swarm un-manned system. The AI based computing system 106 allows the human to issue high-level commands to the heterogeneous swarm as a whole, while the one or more autonomous robots 110 behave cooperatively to do lower level taskings to achieve the high-level commands in a cooperative manner. Further, the synthetic simulation module 230 abstracts the AI based computing system 106 and the human machine interface 102 with each other, thus testing the hypothesis and mission via simulation in a synthetic environment. The AI based computing system 106 achieves swarming behavior through the one or more autonomous robots 110 without having any dominant master doing the decision making i.e., man or unmanned agent. The AI based computing system 106 allows a human in the loop to make sense of the heterogeneous swarm demonstrating these behaviour and issue high-level commands i.e., not controlling individual autonomous robots. Furthermore, the AI based solutions allows the operator to mix heterogeneous swarm of the one or more autonomous robots 110 i.e., autonomous robots with different configuration and composition in a cooperative swarm. For example, heterogenous swarm may be mixed of unmanned aerial systems with unmanned ground vehicles (UAV+UGV), but also different classes of UAVs (a notional example could be 20 kg hexacopters with 10 kg quadcopters), and also different configuration, e.g., UAVs with different payloads (e.g.: one UAV with a camera payload vs one UAV with a communication enabling antenna payload). In an embodiment of the present disclosure, swarming is relatively easy to do when enabled with a network though a GCS. However, it has heavy dependency on a master node, and robust communication. The AI based computing system 106 may operate with a link to a ground control station totally severed (and taking a human/GCS totally out of the loop) and may operate in a communication denied or degraded mode. Furthermore, the AI based computing system 106 is deployed on each of the one or more autonomous robots 110 to drive them to replicable biologically inspired swarm behaviors that takes into account of other agents in the swarm. In the heterogeneous swarm, all autonomous robots may be having same configuration, as some might be equipped with different payload like camera while others may be of different types, such as hexacopters, quadcopter and the like. Further, the human machine interface 102 allows the operator to be able to command and monitor a swarm mission using the high-level commands, such that the operator is not required to control individual autonomous robots in the swarm. In an embodiment of the present disclosure, the heterogeneous swarm of the one or more autonomous robots 110 do autonomous take-off and demonstrates a flocking behavior, like a flock of birds behavior cohesively. When the heterogeneous swarm of the one or more autonomous robots 110 reach a designated area, the one or more autonomous robots 110 collaboratively divide the target area amongst themselves and start a forage behavior, thus covering the area looking for targets.

Further, the AI based computing system 106 allows the operator to engage the heterogeneous swarm and issues the heterogenous swarm high-level commands in the context of space and time. The heterogeneous swarm mimics biologically and robotic inspired behaviour of swarming, such as there is strength in numbers, so swarm elements tend to stick together. However, this leads to a problem of swarm entities colliding, so the AI based computing system 106 enables a property of cohesion together, while doing intra-swarm collision avoidance. Further, swarming solution allows unmanned agent to move cooperatively while maintaining relative position and velocity matching. In an embodiment of the present disclosure, the heterogeneous swarm is also enabled with obstacle avoidance and the obstacle information could be given prior or emerge as the heterogeneous swarm is moving. The heterogeneous swarm is able to search a given area employing biological and robotic inspired search optimisation methods and leverage searching by a wide number of autonomous robots that share their information with each other thus resulting in an optimum search. In an embodiment of the present disclosure, a human operator is not required to operate the heterogeneous swarm involved other than the initial mission description, however the human operator can choose to be in the loop and do dynamic instructions to modify the swarm behaviour during the swarming session. Thus, the swarm of the one or more autonomous robots 110 do not need any ground control station for constant monitoring. Further, the human operator may simulate the swarming missions through synthetic environments prior to the mission and get a feel of what the sessions may emerge like. In an embodiment of the present disclosure, the human operator may play back a swarming session that unfolded over space and time by using the one or more electronic devices 104. Furthermore, the human operator may interface with the swarm over a 2D screen with point and click interface, or through virtual and augmented reality interfaces for enhanced and contextual situational awareness.

In an embodiment of the present disclosure, each of the one or more autonomous robots 110 may work independent of network connection after initial command input. The AI based computing system 106 is configured in each of one or more autonomous robots 110 and thereby enables the heterogeneous swarm to act in unison as a single entity. The AI based computing system 106 enables a controlled swarming behaviour of the one or more autonomous robots 110 in a pre-defined target environment. In such embodiment, for achieving the swarming behaviour, the AI based computing system 106 issues each of the one or more autonomous robots 110 a set of commands based on a high-level command received from the command centre via the communication network 108. It is to be noted that the high-level command is not meant for controlling individual autonomous robots but for the heterogeneous swarm. The AI based computing system 106 also enables breaking a set of activities related to the high-level command and assigning specific activities to each of the one or more autonomous robots 110 based on their functional capabilities. Therefore, once the high-level command is received, the heterogeneous swarm may function and complete the assigned task even in absence of communication network 108 from the command centre. Hence, the term network agnostic us used in the context of the present invention. This feature immensely extends the reach and expanse of operations that the heterogeneous swarm may perform. In an embodiment of the present disclosure, the AI based computing system 106 enables different class of the one or more autonomous robots 110 to work autonomously and cooperatively as a single swarm for single or multiple tasks concurrently or in stages. In such embodiment, the autonomously and cooperative working enables for an operator to make sense of the swarm's behaviour. In an embodiment of the present disclosure, the AI based computing system 106 enables autonomous take-off of each of the one or more unmanned vehicles (20), flocking behaviour of each of the one or more autonomous robots 110 and the like. For example, the set of commands enable the one or more autonomous robots 110 to autonomously take off and divide a target environment among themselves without being instructed by any master vehicle or the command centre. The set of commands may also include path obstacle information. The human-machine interface is configured in the one or more electronic devices

104 and operatively coupled to the AI based computing system 106 via the communication network 108. The human-machine interface enables the operator to actuate and monitor the swarming behaviour of the one or more autonomous robots 110 through the one or more electronic devices 104. In an embodiment of the present disclosure, the operator may control complete set of the one or more autonomous robots 110 through the high-level commands.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-RAY) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. An Artificial Intelligence (AI) based computing system (106) for managing heterogeneous network-agnostic swarm of robots, the computing system comprising:

one or more hardware processors; and a memory (204) coupled to the one or more hardware processors (202), wherein the memory (204) comprises a plurality of modules (114) in the form of programmable instructions executable by the one or more hardware processors (202), wherein the plurality of modules (114) comprises:

a data receiver module (210) configured to receive a set of commands from a human machine interface (102)

associated with one or more electronic devices (104) to perform one or more tasks via one or more autonomous robots (110) at one or more targets, wherein the set of commands are derived from one or more high-level commands provided by an operator for performing the one or more tasks via the one or more autonomous robots (110);

a capability determination module (212) configured to determine one or more robotic capabilities associated with autonomous robot based on the received set of commands and predefined robotic information, wherein the one or more robotic capabilities comprise: type of payload, type of sensors, speed, weight holding capacity, configuration, battery level, class and weight of the autonomous robot;

a parameter capturing module (214) configured to capture one or more positional parameters by using one or more sensors (112), wherein the one or more positional parameters comprise: position of the autonomous robot, anticipated position of the autonomous robot, one or more images of the one or more targets, one or more videos of the one or more targets, a set of images of other autonomous robots in proximity, a set of videos of the other autonomous robots and one or more audios of surrounding environment;

a broadcasting module (216) configured to broadcast the determined one or more robotic capabilities and the captured one or more positional parameters to each of the one or more autonomous robots (110), wherein the determined one or more robotic capabilities and the captured one or more positional parameters are compressed and encrypted before broadcasting to maintain data privacy;

a parameter determination module (218) configured to determine one or more situational parameters associated with the one or more autonomous robots (110) based on one or more responses of the broadcasted one or more robotic capabilities and the broadcasted one or more positional parameters, the received set of commands, the determined one or more robotic capabilities and the captured one or more positional parameters by using a robot management based Artificial Intelligence (AI) model, wherein the robot management based AI model is configured for decentralized collaborative optimization by enabling each of the one or more autonomous robots (110) to locally analyze one or more optimization parameters received from each of the one or more autonomous robots (110) in proximity, comprising at least one of: images, videos, audio signals, and sensor telemetry, and to periodically synchronize locally learned one or more optimization parameters across the heterogeneous network-agnostic swarm of robots to optimize task performance, wherein the one or more situational parameters comprise: type of payload, type of sensors, speed, weight capacity, class, battery level of each of the one or more autonomous robots (110), position of each of the one or more autonomous robots (110), anticipated position of each of the one or more autonomous robots (110), one or more images of the one or more targets, one or more videos of the one or more targets, a set of images of the one or more autonomous robots (110), a set of videos of the one or more autonomous robots (110), relative position of the autonomous robots with respect to each of the one or more autonomous robots (110) and one or more audios of surrounding environment;

a target detection module (220) configured to detect the one or more targets based on the received set of commands, the determined one or more robotic capabilities, the captured one or more positional parameters and the determined one or more situational parameters by using the robot management based AI model;

a task allocation module (222) configured to allocate the one or more tasks and the detected one or more targets among the one or more autonomous robots (110) based on the received set of commands, the determined one or more robotic capabilities, the captured one or more positional parameters, the determined one or more situational parameters, one or more target parameters and predefined allocation information by using the robot management based AI model, wherein the one or more target parameters comprise: number of the one or more target, size of each of the one or more targets and sensor footprint corresponding to each of the one or more autonomous robots (110) representing at least one of: spatial and functional sensing coverage area for each the one or more autonomous robots (110);

a synthetic simulation module (230) configured to:
  create a high-fidelity representation of the one or more autonomous robots (110) in a three-dimensional (3D) space to at least one of: test and replay dynamic behavior of the one or more autonomous robot, wherein the created high-fidelity representation of the one or more autonomous robots (110) in the three-dimensional (3D) space corresponds to a virtual simulation environment;
  create one or more virtual tasks and test hypothesis in the virtual simulation environment;
  train the robot management-based AI model in the virtual simulation environment based on one or more simulation rules;
  at least one of: test and develop the human machine interface (102) for training the operator;

a task performing module (224) configured to perform the one or more tasks at the detected one or more targets based on allocation of the one or more tasks and the detected one or more tasks among the one or more autonomous robots (110) by using the robot management based AI model;

an action performing module (226) configured to determine one or more collision parameters based on the determined one or more situational parameters by using the robot management based AI model, wherein the one or more collision parameters comprise: relative position of each of one or more autonomous robots (110) with respect to each other, free space between each of one or more autonomous robots (110), position, anticipated position and speed of each of the one or more autonomous robots (110) and one or more obstacles in vicinity of each of the one or more autonomous robots (110);

perform one or more actions based on the determined one or more collision parameters, a threshold distance, the received set of commands and the determined one or more situational parameters by using the robot management based AI model to prevent collision of the one or more autonomous robots (110) while moving on navigation path, wherein the one or more actions comprise: move left, move upward, move right, move downward and stay still;

wherein each of the one or more autonomous robots (110) applies an attraction force when beyond a threshold distance from other autonomous robots (110) and a repulsion force when within the threshold distance to maintain swarm formation without collision; and wherein the AI based computing system (106) corresponds to the autonomous robot from the one or more autonomous robots (110), wherein the one or more autonomous robots (110) collectively form a heterogeneous swarm to collaboratively perform the one or more tasks and wherein the heterogeneous swarm corresponds to swarm of manned and unmanned autonomous vehicles to achieve Manned-Unmanned Teaming (MUMT) characteristics;

a task optimization module (228) configured to:

determine one or more task parameters by using the one or more sensors (112) and the robot management based AI model upon performing the one or more tasks at the detected one or more targets, wherein the one or more task parameters comprise: number of tasks executed by the autonomous robot at the detected one or more targets, images, videos and audios captured by the autonomous robots, one or more objects in vicinity of the detected one or more targets and payload used, wherein the one or more task parameters are compressed and encrypted before broadcasting to maintain data privacy;

broadcast the determined one or more task parameters to each of the one or more autonomous robots (110);

determine the one or more optimization parameters associated with the one or more autonomous robots (110) based on one or more responses of the broadcasted one or more task parameters by using the robot management based AI, wherein the one or more optimization parameters comprise:

number of tasks executed by each of one or more autonomous robots (110) at the detected one or more targets, images, videos and audios captured by each of one or more autonomous robots (110), a set of objects in vicinity of the detected one or more targets and payload used by each of one or more autonomous robots (110); and optimize the received set of commands based on the determined one or more robotic capabilities, the captured one or more positional parameters, the determined one or more situational parameters, the one or more target parameters, the predefined allocation information, one or more emergency commands and the determined one or more optimization parameters by using the robot management based AI model to efficiently perform the one or more tasks.

2. The AI based computing system (106) as claimed in claim 1, wherein the one or more high-level commands comprise: a set of predefined commands representing the one or more tasks to be performed by the one or more autonomous robots (110), source, destination, time of performing the one or more tasks, role and speed of each of the one or more autonomous vehicles, altitude from ground, one or more predefined conditions, a navigation path from the source to the destination, boundary fence, one or more intermediate locations, the one or more targets, safe area, and danger area, wherein the one or more high-level commands are provided on a geo-referenced map.

3. The AI based computing system (106) as claimed in claim 1, further comprises a live data detection module (232) configured to:

detect one or more live parameters associated with the autonomous robots at real-time by using the one or more sensors (112) and the robot management based AI model, wherein the one or more live parameters comprise: health, flight mode, current routine, routine data, speed, battery of the autonomous robot, tasks performed by the autonomous robot, number of autonomous robots in vicinity of the autonomous robots and multimedia data of surrounding environment; and output the detected one or more live parameters to the human machine interface (102) associated with one or more electronic devices (104).

4. The AI based computing system (106) as claimed in claim 1, wherein the one or more electronic devices (104) include a laptop computer, desktop computer, tablet computer, smartphone, wearable device, smartwatch and a digital camera, wherein the wearable device includes an augmented reality headset and a virtual reality headset, wherein the augmented reality headset and the virtual reality headset allows interfacing with heterogeneous swarm and wherein the operator plays back a swarming session that unfolded over space and time by using the one or more electronic devices (104).

5. An Artificial Intelligence (AI) based method for managing heterogeneous network-agnostic swarm of robots, the method comprising:

receiving, by one or more hardware processors (202), a set of commands from a human machine interface (102) associated with one or more electronic devices (104) to perform one or more tasks via one or more autonomous robots (110) at one or more targets, wherein the set of commands are derived from one or more high-level commands provided by an operator for performing the one or more tasks via the one or more autonomous robots (110);

determining, by the one or more hardware processors (202), one or more robotic capabilities associated with autonomous robot based on the received set of commands and predefined robotic information, wherein the one or more robotic capabilities comprise: type of payload, type of sensors, speed, weight holding capacity, configuration, battery level, class and weight of the autonomous robot;

capturing, by the one or more hardware processors (202), one or more positional parameters by using one or more sensors (112), wherein the one or more positional parameters comprise: position of the autonomous robot, anticipated position of the autonomous robot, one or more images of the one or more targets, one or more videos of the one or more targets, a set of images of other autonomous robots in proximity, a set of videos of the other autonomous robots and one or more audios of surrounding environment;

broadcasting, by the one or more hardware processors (202), the determined one or more robotic capabilities and the captured one or more positional parameters to each of the one or more autonomous robots (110), wherein the determined one or more robotic capabilities and the captured one or more positional parameters are compressed and encrypted before broadcasting to maintain data privacy;

determining, by the one or more hardware processors (202), one or more situational parameters associated with the one or more autonomous robots (110) based on one or more responses of the broadcasted one or more robotic capabilities and the broadcasted one or more positional parameters, the received set of commands, the determined one or more robotic capabilities and the captured one or more positional parameters by using a robot management based Artificial Intelligence (AI) model, wherein the robot management based AI model is configured for decentralized collaborative optimization by enabling each of the one or more autonomous robots (110) to locally analyze one or more optimization parameters received from each of the one or more autonomous robots (110) in proximity, comprising at least one of: images, videos, audio signals, and sensor telemetry, and to periodically synchronize locally learned one or more optimization parameters across the heterogeneous network-agnostic swarm of robots to optimize task performance, wherein the one or more situational parameters comprise: type of payload, type of sensors, speed, weight capacity, class, battery level of each of the one or more autonomous robots (110), position of each of the one or more autonomous robots (110), anticipated position of each of the one or more autonomous robots (110), one or more images of the one or more targets, one or more videos of the one or more targets, a set of images of the one or more autonomous robots (110), a set of videos of the one or more autonomous robots (110), relative position of the autonomous robots with respect to each of the one or more autonomous robots (110) and one or more audios of surrounding environment;

detecting, by the one or more hardware processors (202), the one or more targets based on the received set of commands, the determined one or more robotic capabilities, the captured one or more positional parameters and the determined one or more situational parameters by using the robot management based AI model;

allocating, by the one or more hardware processors (202), the one or more tasks and the detected one or more targets among the one or more autonomous robots (110) based on the received set of commands, the determined one or more robotic capabilities, the captured one or more positional parameters, the determined one or more situational parameters, one or more target parameters and predefined allocation information by using the robot management based AI model, wherein the one or more target parameters comprise: number of the one or more target, size of each of the one or more targets and sensor footprint corresponding to each of the one or more autonomous robots (110) representing at least one of:

spatial and functional sensing coverage area for each the one or more autonomous robots (110);

creating a high-fidelity representation of the one or more autonomous robots (110) in a three-dimensional (3D) space to at least one of: test and replay dynamic behavior of the one or more autonomous robot, wherein the created high-fidelity representation of the one or more autonomous robots (110) in the three-dimensional (3D) space corresponds to a virtual simulation environment;

creating one or more virtual tasks and test hypothesis in the virtual simulation environment;

training the robot management based AI model in the virtual simulation environment based on one or more simulation rules;

at least one of: testing and developing the human machine interface (102) for training the operator;

performing, by the one or more hardware processors (202), the one or more tasks at the detected one or more targets based on allocation of the one or more tasks and the detected one or more tasks among the one or more autonomous robots (110) by using the robot management based AI model;

determining one or more collision parameters based on the determined one or more situational parameters by using the robot management based AI model, wherein the one or more collision parameters comprise: relative position of each of one or more autonomous robots (110) with respect to each other, free space between each of one or more autonomous robots (110), position, anticipated position and speed of each of the one or more autonomous robots (110) and one or more obstacles in vicinity of each of the one or more autonomous robots (110); and performing one or more actions based on the determined one or more collision parameters, a threshold distance, the received set of commands and the determined one or more situational parameters by using the robot management based AI model to prevent collision of the one or more autonomous robots (110) while moving on navigation path, wherein the one or more actions comprise: move left, move upward, move right, move downward and stay still;

wherein each of the one or more autonomous robots (110) applies an attraction force when beyond a threshold distance from other autonomous robots (110) and a repulsion force when within the threshold distance to maintain swarm formation without collision; and wherein the AI based method is performed by the autonomous robot from the one or more autonomous robots (110), wherein the one or more autonomous robots (110) collectively form a heterogeneous swarm to collaboratively perform the one or more tasks and wherein the heterogeneous swarm corresponds to swarm of manned and unmanned autonomous vehicles to achieve Manned-Unmanned Teaming (MUMT) characteristics;

determining one or more task parameters by using the one or more sensors (112) and the robot management based AI model upon performing the one or more tasks at the detected one or more targets, wherein the one or more task parameters comprise: number of tasks executed by the autonomous robot at the detected one or more targets, images, videos and audios captured by the autonomous robots, one or more objects in vicinity of the detected one or more targets and payload used, wherein the one or more task parameters are compressed and encrypted before broadcasting to maintain data privacy;

broadcasting the determined one or more task parameters to each of the one or more autonomous robots (110);

determining the one or more optimization parameters associated with the one or more autonomous robots (110) based on one or more responses of the broadcasted one or more task parameters by using the robot management based AI, wherein the one or more optimization parameters comprise: number of tasks executed by each of one or more autonomous robots (110) at the detected one or more targets, images, videos and audios captured by each of one or more autonomous robots 110, a set of objects in vicinity of the detected one or more targets and payload used by each of one or more autonomous robots (110); and optimizing the received set of commands based on the determined one or more robotic capabilities, the captured one or more positional parameters, the determined one or more situational parameters, the one or more target parameters, the predefined allocation information, one or more emergency commands and the determined one or more optimization parameters by using the robot management- based AI model to efficiently perform the one or more tasks.

6. The AI based method as claimed in claim 5, wherein the one or more high-level commands comprise: a set of predefined commands representing the one or more tasks to be performed by the one or more autonomous robots (110), source, destination, time of performing the one or more tasks, role and speed of each of the one or more autonomous vehicles, altitude from ground, one or more predefined conditions, a navigation path from the source to the destination, boundary fence, one or more intermediate locations, the one or more targets, safe area, and danger area, wherein the one or more high-level commands are provided on a geo-referenced map.

7. The AI based method as claimed in claim 5, wherein transmitting a request from a source node to a best possible node via a communication path comprises:

detecting one or more live parameters associated with the autonomous robots at real-time by using the one or more sensors (112) and the robot management based AI model, wherein the one or more live parameters comprise: health, flight mode, current routine, routine data, speed, battery of the autonomous robot, tasks performed by the autonomous robot, number of autonomous robots in vicinity of the autonomous robots and multimedia data of surrounding environment; and outputting the detected one or more live parameters to the human machine interface (102) associated with one or more electronic devices (104).

8. The AI based method as claimed in claim 5, wherein the one or more electronic devices (104) include a laptop computer, desktop computer, tablet computer, smartphone, wearable device, smartwatch and a digital camera, wherein the wearable device includes an augmented reality headset and a virtual reality headset, wherein the augmented reality headset and the virtual reality headset allows interfacing with heterogeneous swarm and wherein the operator plays back a swarming session that unfolded over space and time by using the one or more electronic devices (104).

* * * * *